United States Patent [19]

Ishibai et al.

[11] Patent Number: 5,166,830
[45] Date of Patent: Nov. 24, 1992

[54] ASPHERICAL LENS SYSTEM FOR A BAR CODE SENSOR

[75] Inventors: Isao Ishibai; Hideaki Koyanagi; Hitonobu Otsu, all of Tokyo, Japan

[73] Assignee: Hoya Corporation, Tokyo, Japan

[21] Appl. No.: 590,214

[22] Filed: Sep. 28, 1990

[30] Foreign Application Priority Data

Sep. 29, 1989 [JP] Japan .................. 1-254806

[51] Int. Cl.$^5$ .................. G02B 13/18; G02B 9/08
[52] U.S. Cl. .................. 359/71; 359/740
[58] Field of Search .................. 350/432, 450, 480; 359/715, 716, 717, 713, 714, 740

[56] References Cited

U.S. PATENT DOCUMENTS

| | | | |
|---|---|---|---|
| 2,586,418 | 2/1952 | Davis | 350/480 |
| 4,109,995 | 8/1978 | Betensky | 359/716 |
| 4,443,067 | 4/1984 | Owen, Jr. et al. | 359/717 X |
| 4,561,730 | 12/1985 | Lawson et al. | 359/715 |

*Primary Examiner*—Scott J. Sugarman
*Attorney, Agent, or Firm*—Ladas & Parry

[57] ABSTRACT

In an optical lens system for use in combination with a bar code sensor, first and second meniscus lenses are arranged back to back along an optical axis on object and image sides, respectively, and are identical in configuration and optical charcteristics with each other. Each meniscus lens has effective aspherical surfaces defined by predetermined formulae. On the assumption that the first and the second meniscus lenses have the same refractive index, the optical lens system satisfies the following formulae:

$$0.25 < (r1/r2)/(n/(n-1)) < 0.5.$$

$$1.2 < f1/f < 1.8,$$

$$0.3 < D/f < 0.6, \text{ and}$$

$$1.0 < K2,$$

where r1 is representative of a radius of curvature measured at an apex of a first aspherical surface of each meniscus lens; r2, a radius of curvature measured at an apex of a second aspherical surface of each meniscus lens; n, the refractive index of the first meniscus lens; f, a combined focal length of a whole of the aspherical lens system, f1, a focal length of the first meniscus lens; D, a total length of the aspherical lens system; and K2, a coefficient of cone of the second aspherical surface.

5 Claims, 29 Drawing Sheets

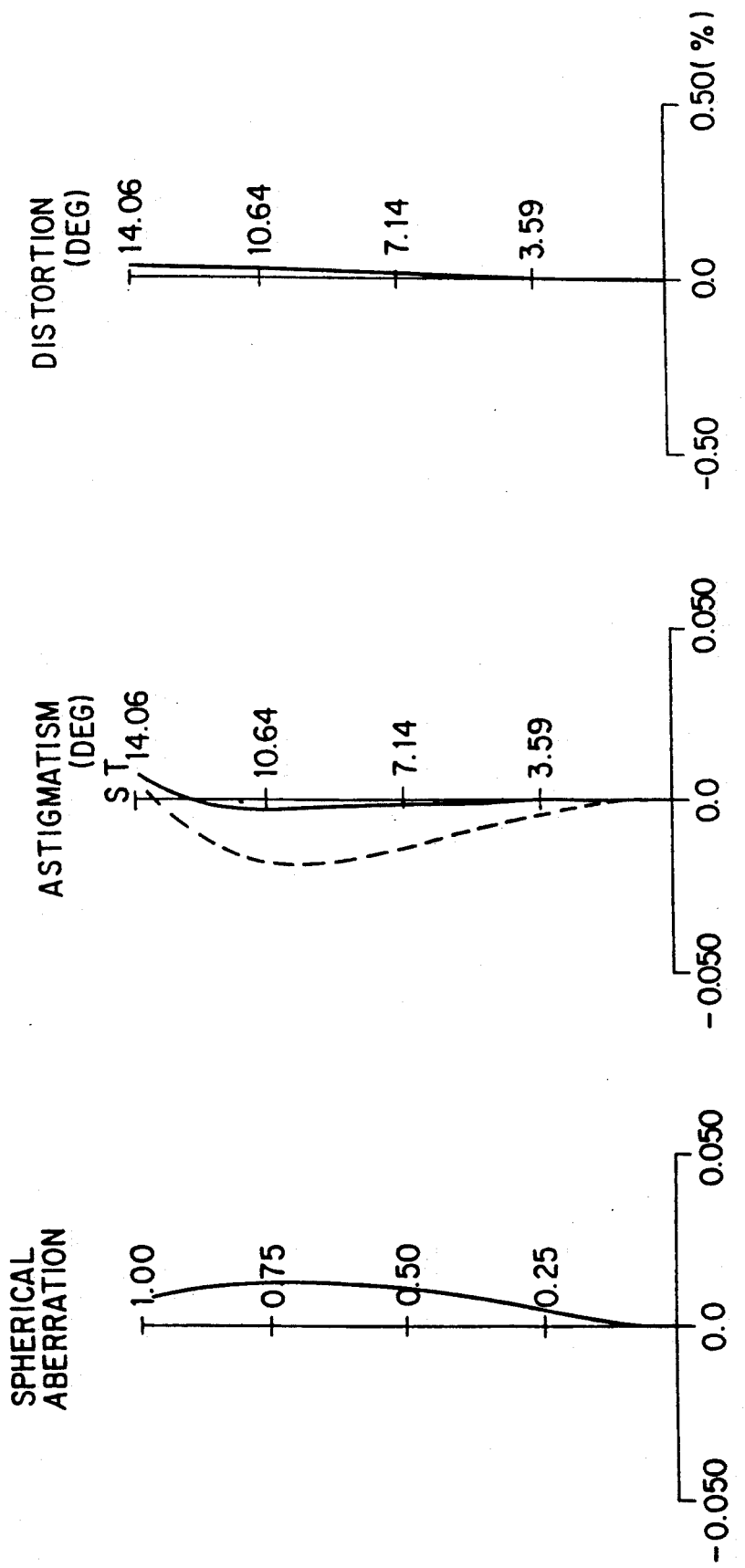

COMAE

| TANGENTIAL | SAGITTAL |
|---|---|
| 0.0500, Y'=7.5 | 0.0500 |
| -0.0500 | -0.0500 |
| FIG. 3A1 | FIG. 3A2 |
| 0.0500, 0.7Y' | 0.0500 |
| -0.0500 | -0.0500 |
| FIG. 3B1 | FIG. 3B2 |
| 0.0500, 0.0Y' | 0.0500 |
| -0.0500 | -0.0500 |
| FIG. 3C1 | FIG. 3C2 |

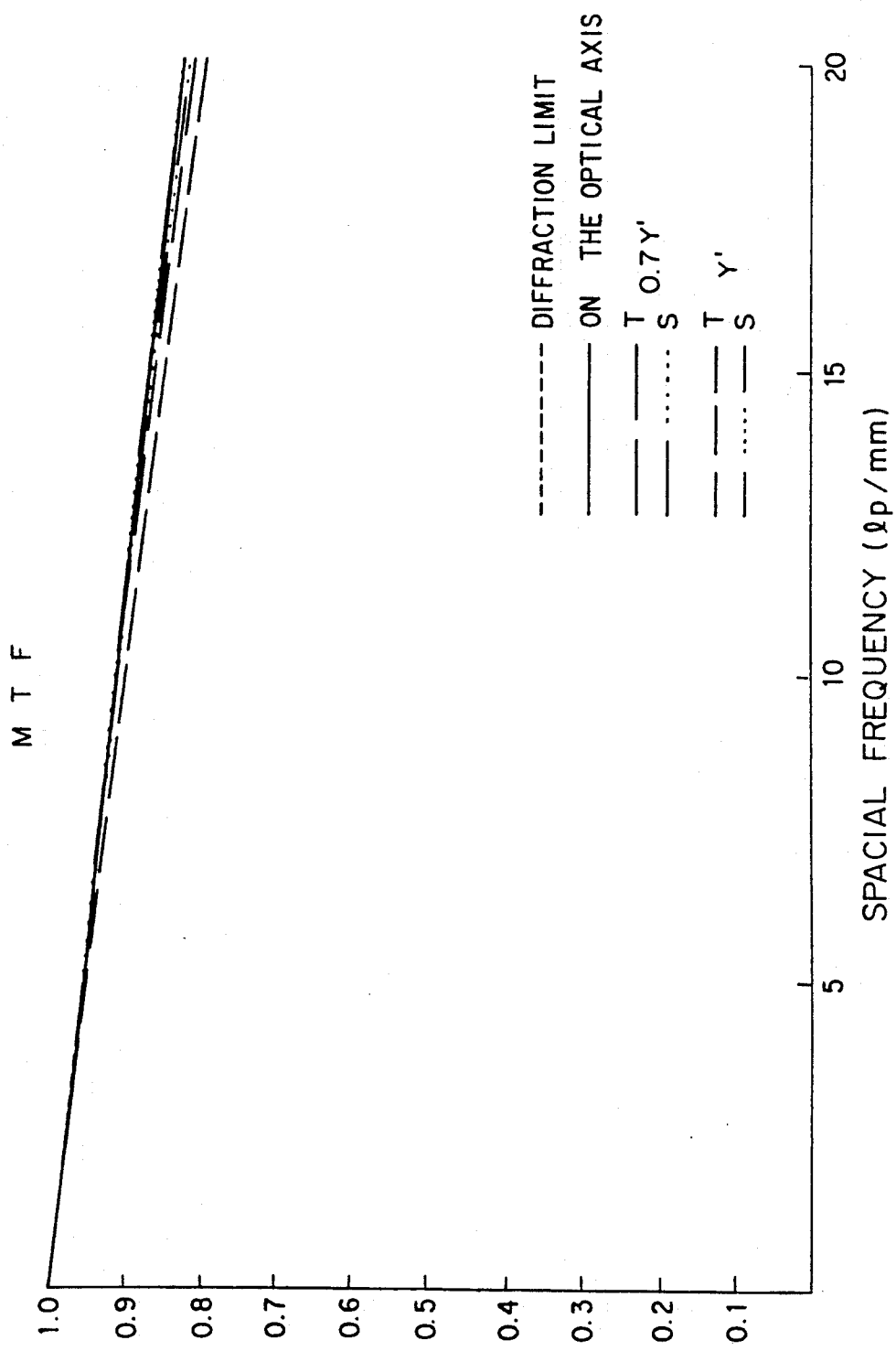

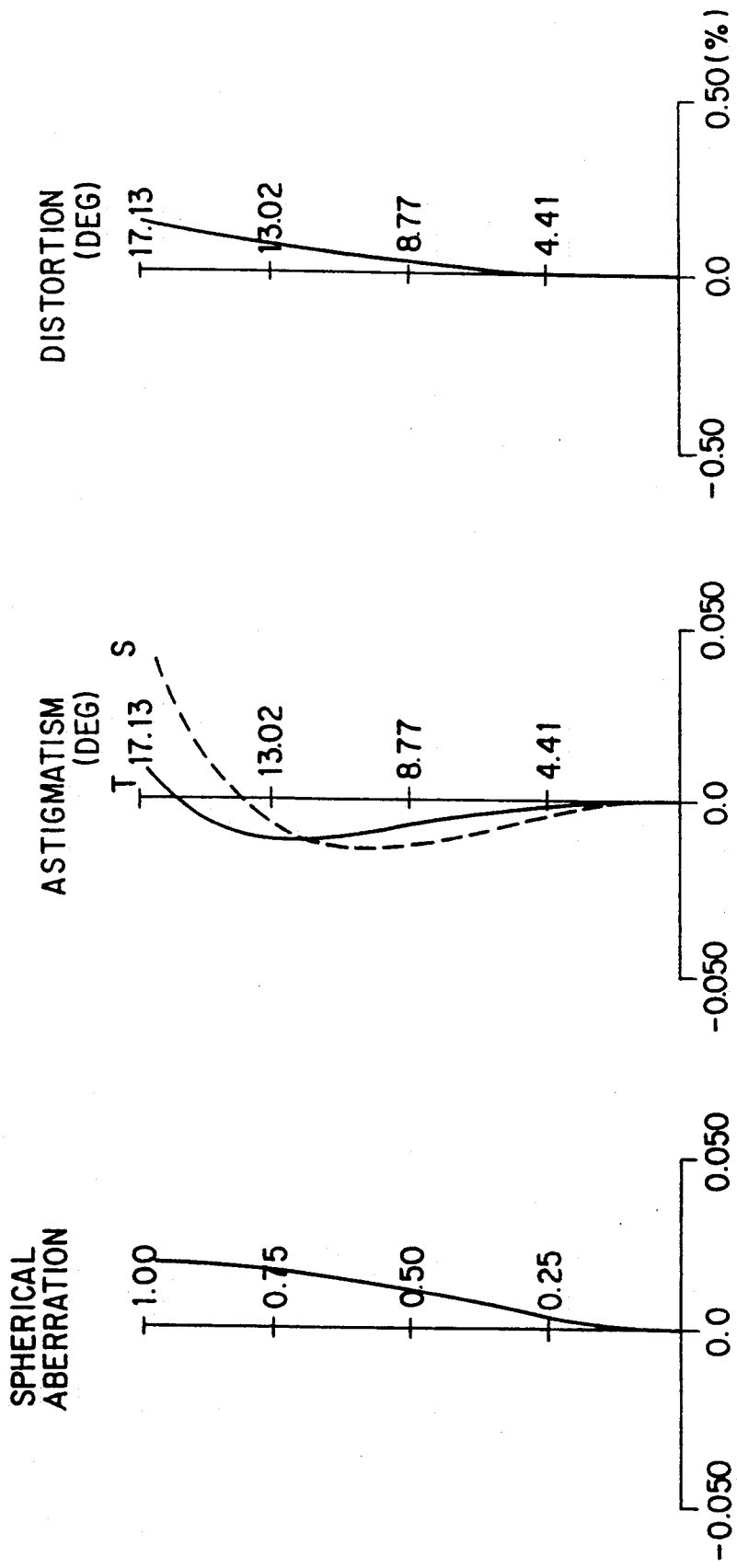

COMAE
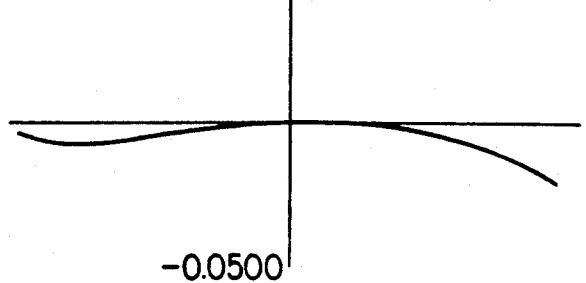
FIG.6A1  FIG.6A2
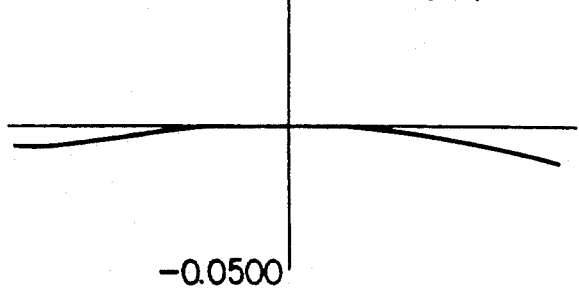
FIG.6B1  FIG.6B2
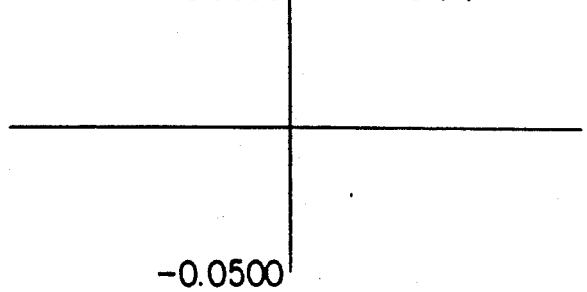
FIG.6C1  FIG.6C2

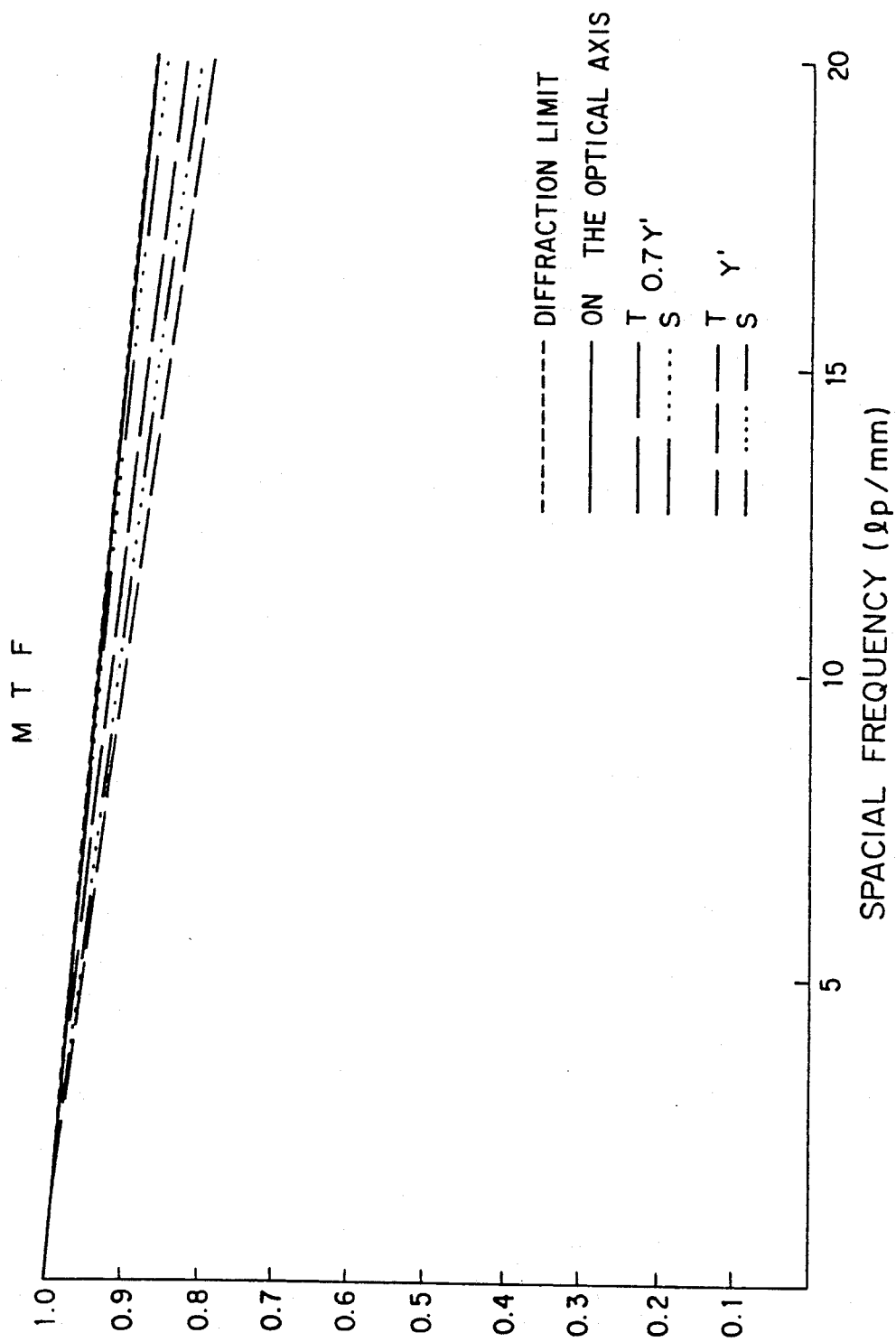

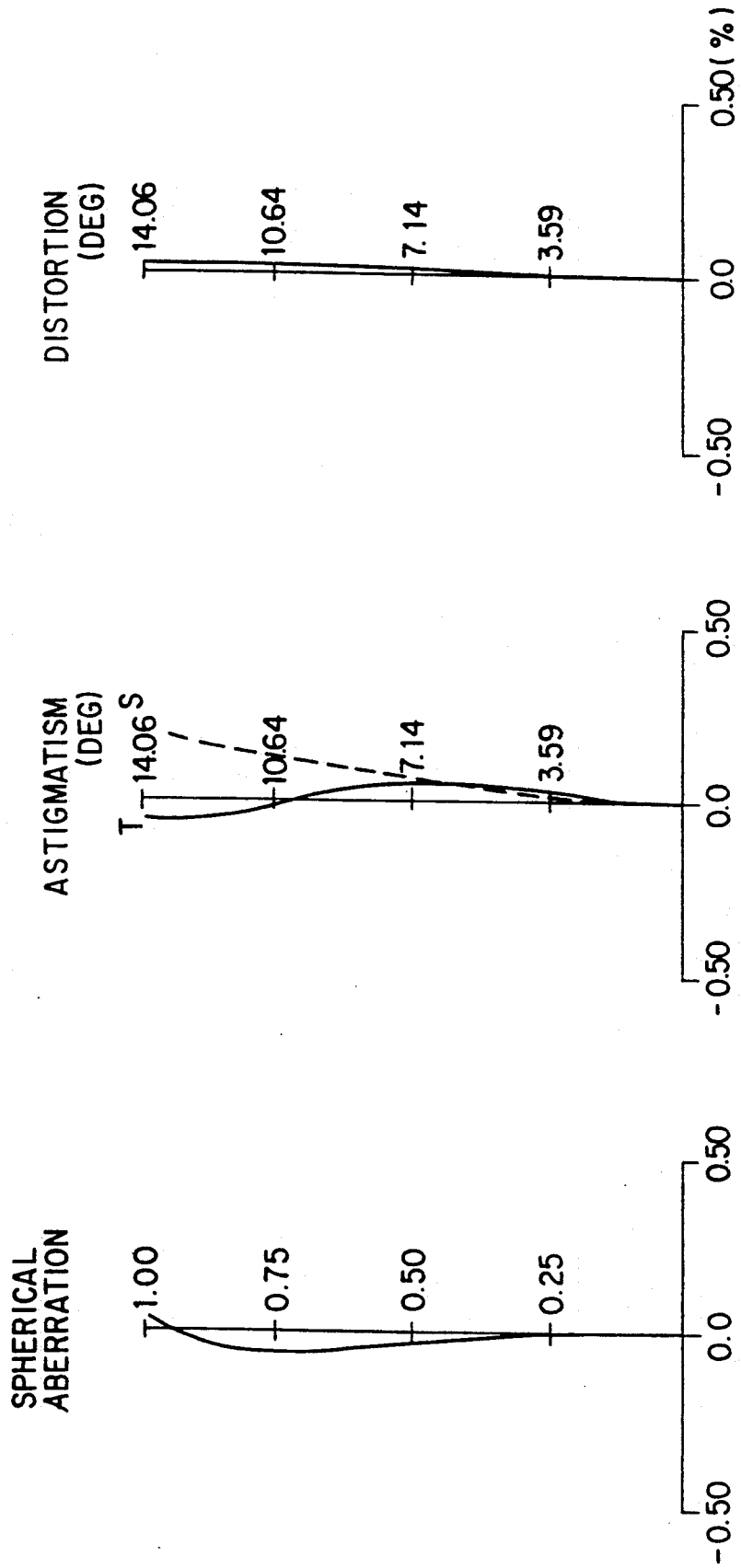

COMAE
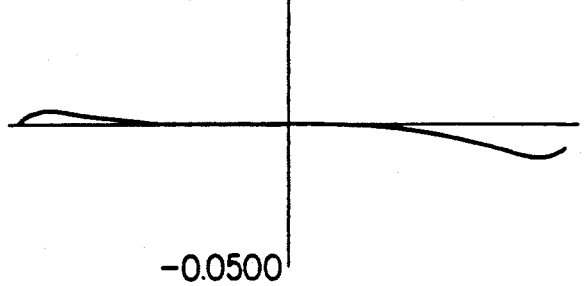
FIG.9A1  FIG.9A2
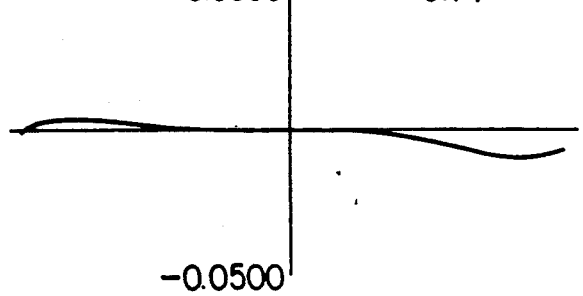
FIG.9B1  FIG.9B2
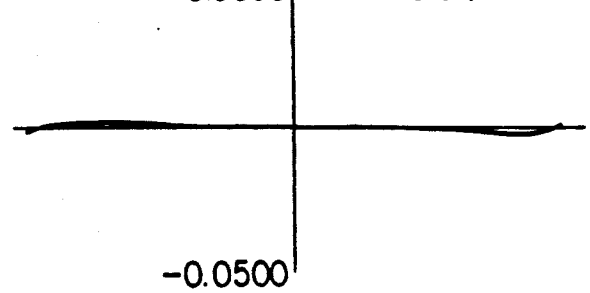
FIG.9C1  FIG.9C2

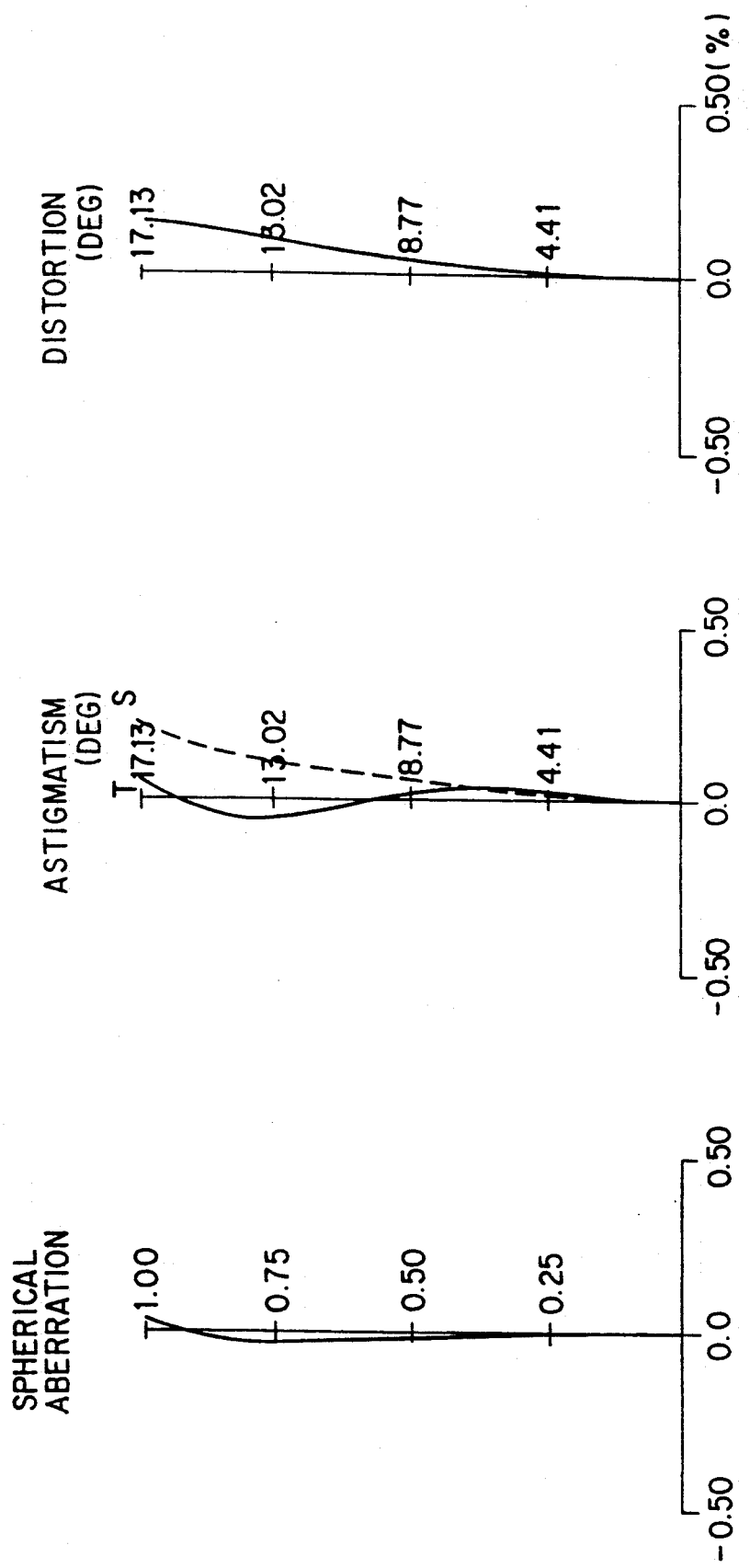

COMAE

| TANGENTIAL | SAGITTAL |
|---|---|
| FIG.12A1  Y'=7.5 | FIG.12A2 |
| FIG.12B1  0.7Y' | FIG.12B2 |
| FIG.12C1  0.0Y' | FIG.12C2 |

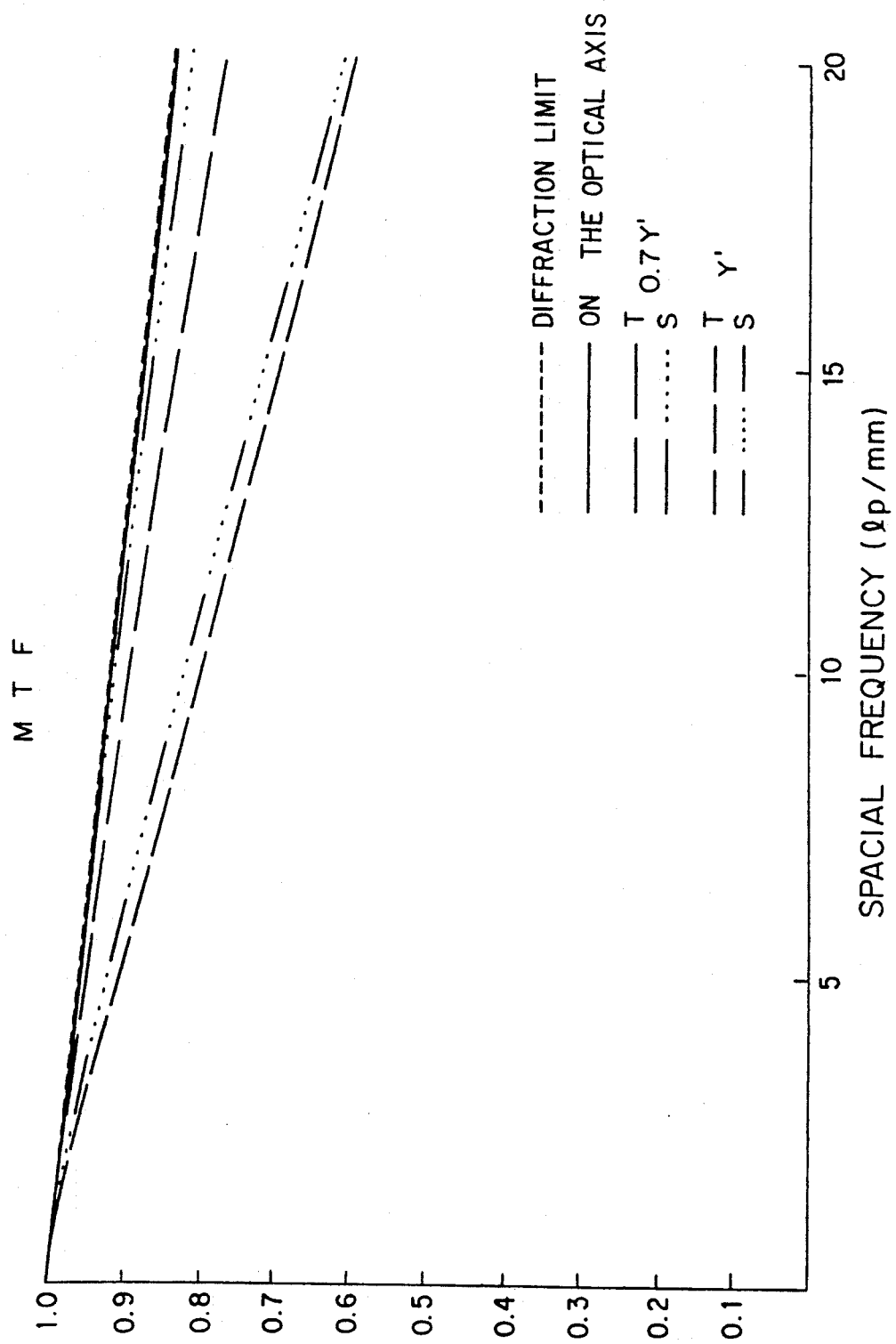

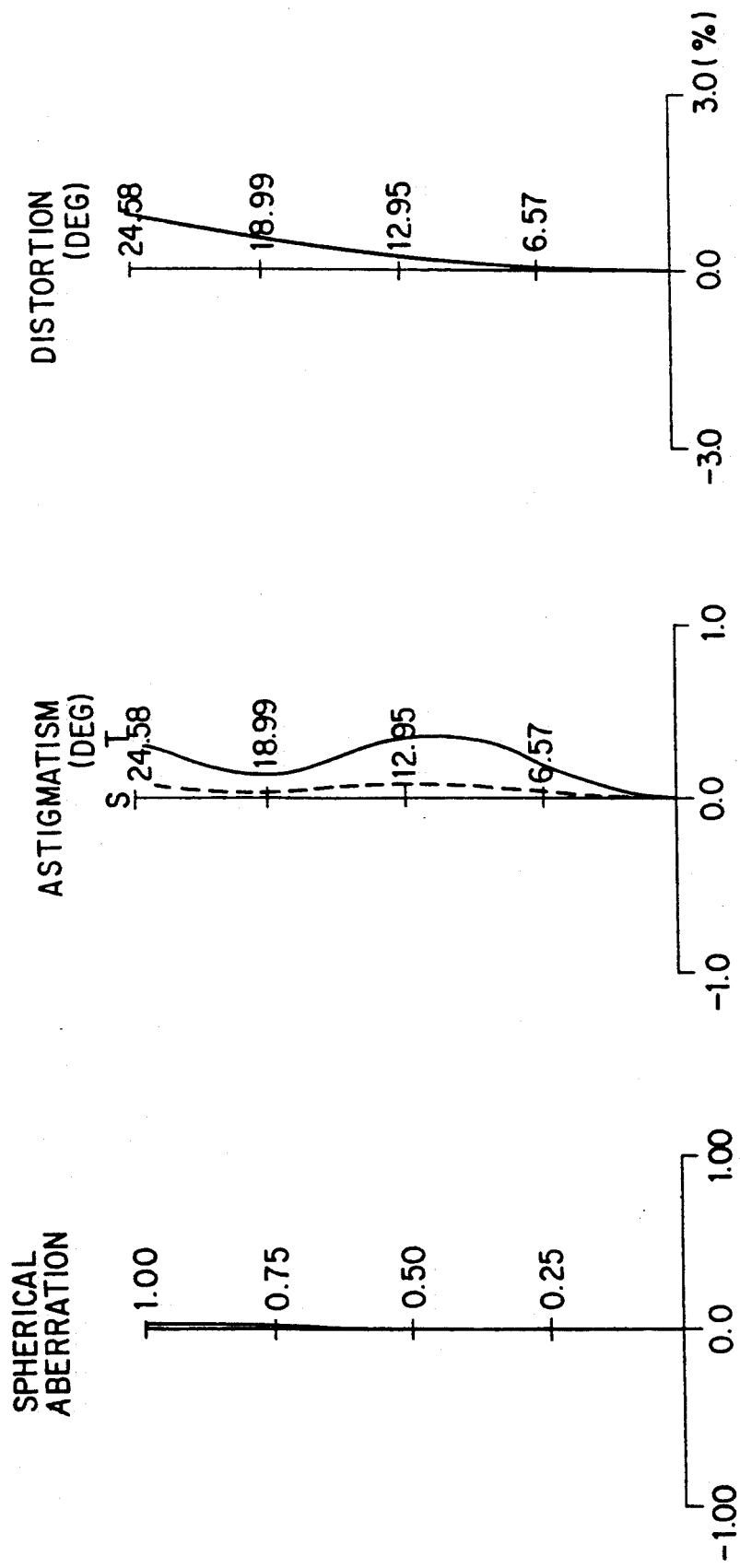

COMAE
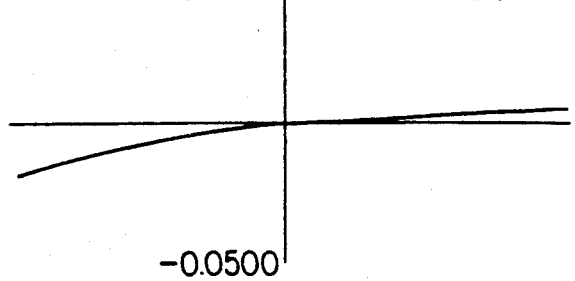
FIG.15A1
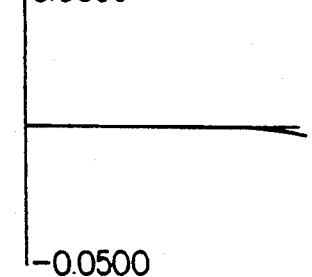
FIG.15A2
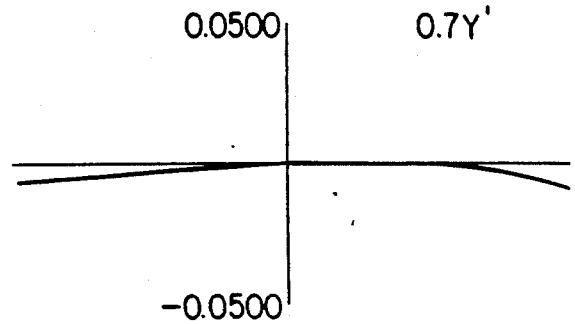
FIG.15B1
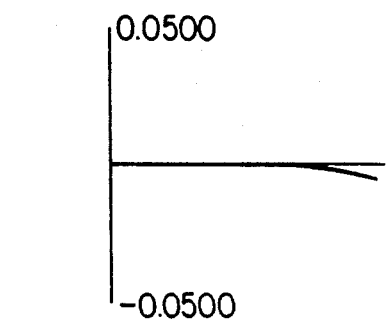
FIG.15B2
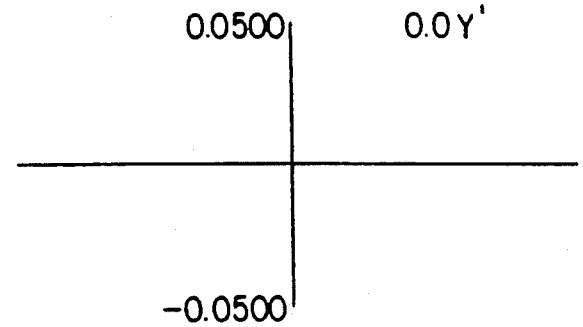
FIG.15C1
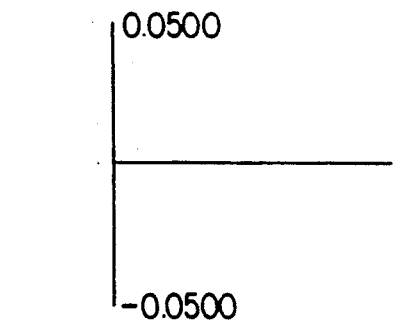
FIG.15C2

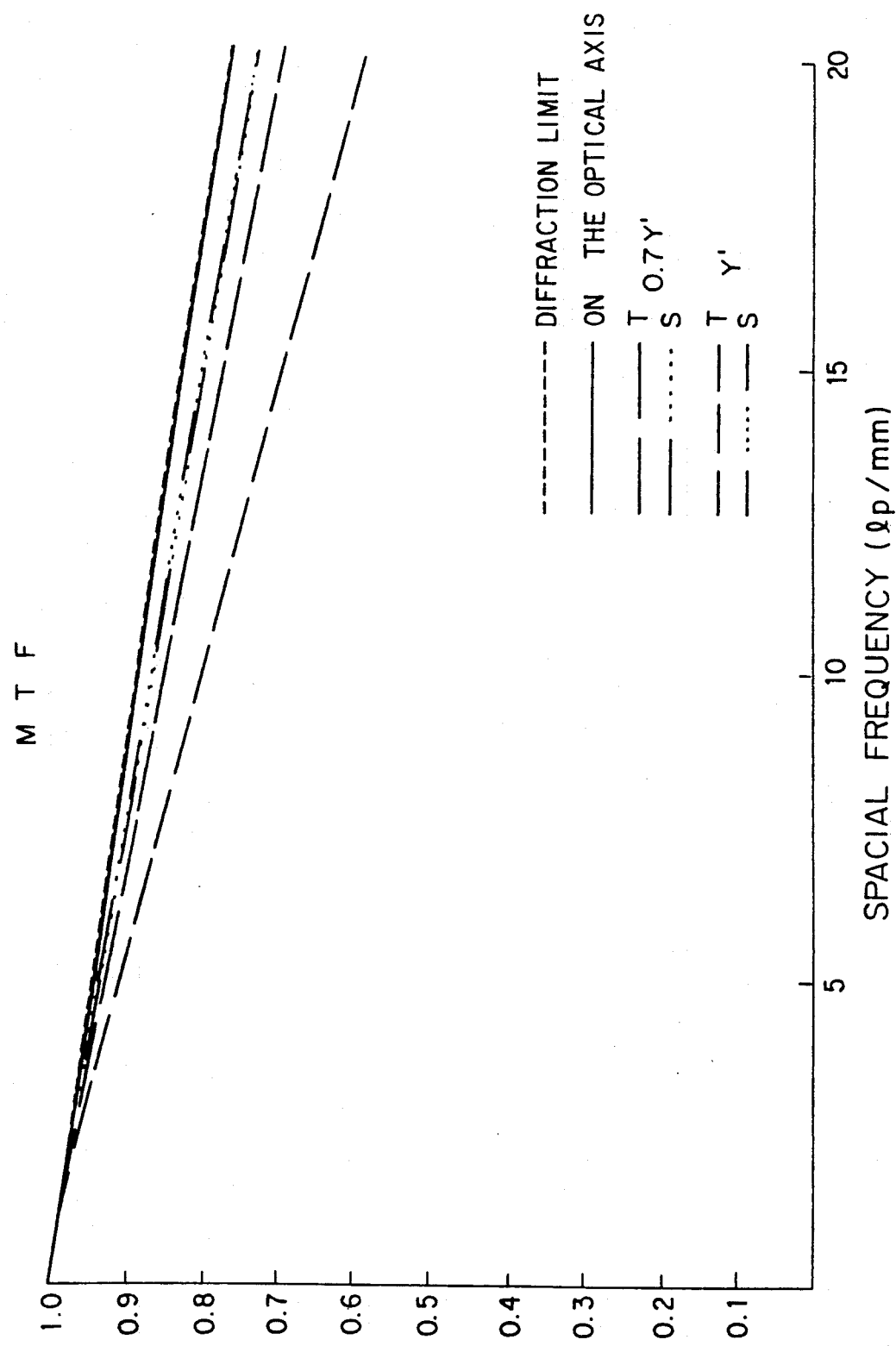

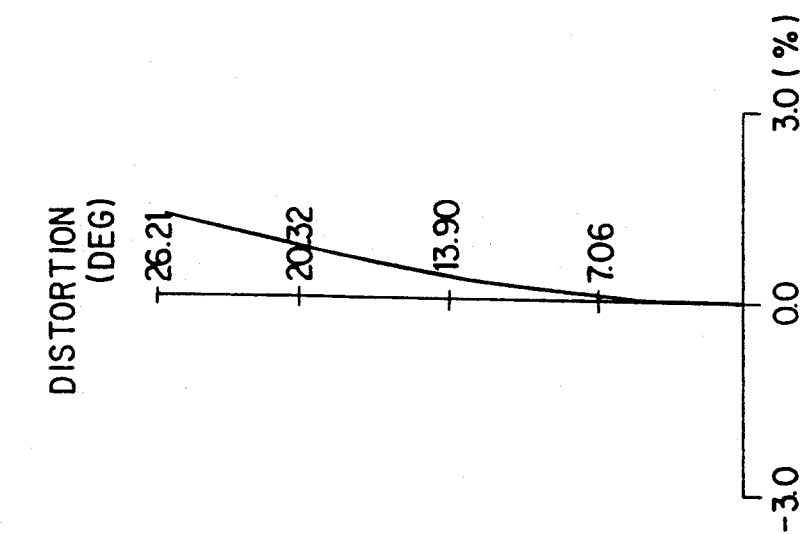
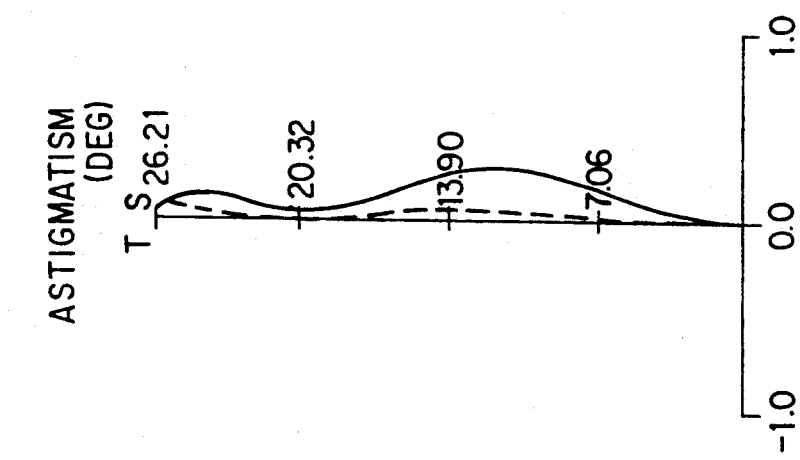
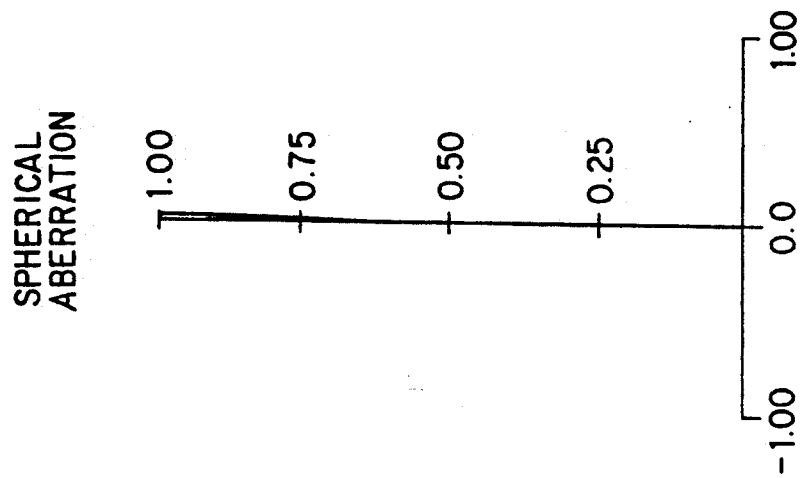

COMAE

TANGENTIAL
0.0500  Y'=14.3
-0.0500
FIG.18A1

SAGITTAL
0.0500
-0.0500
FIG.18A2

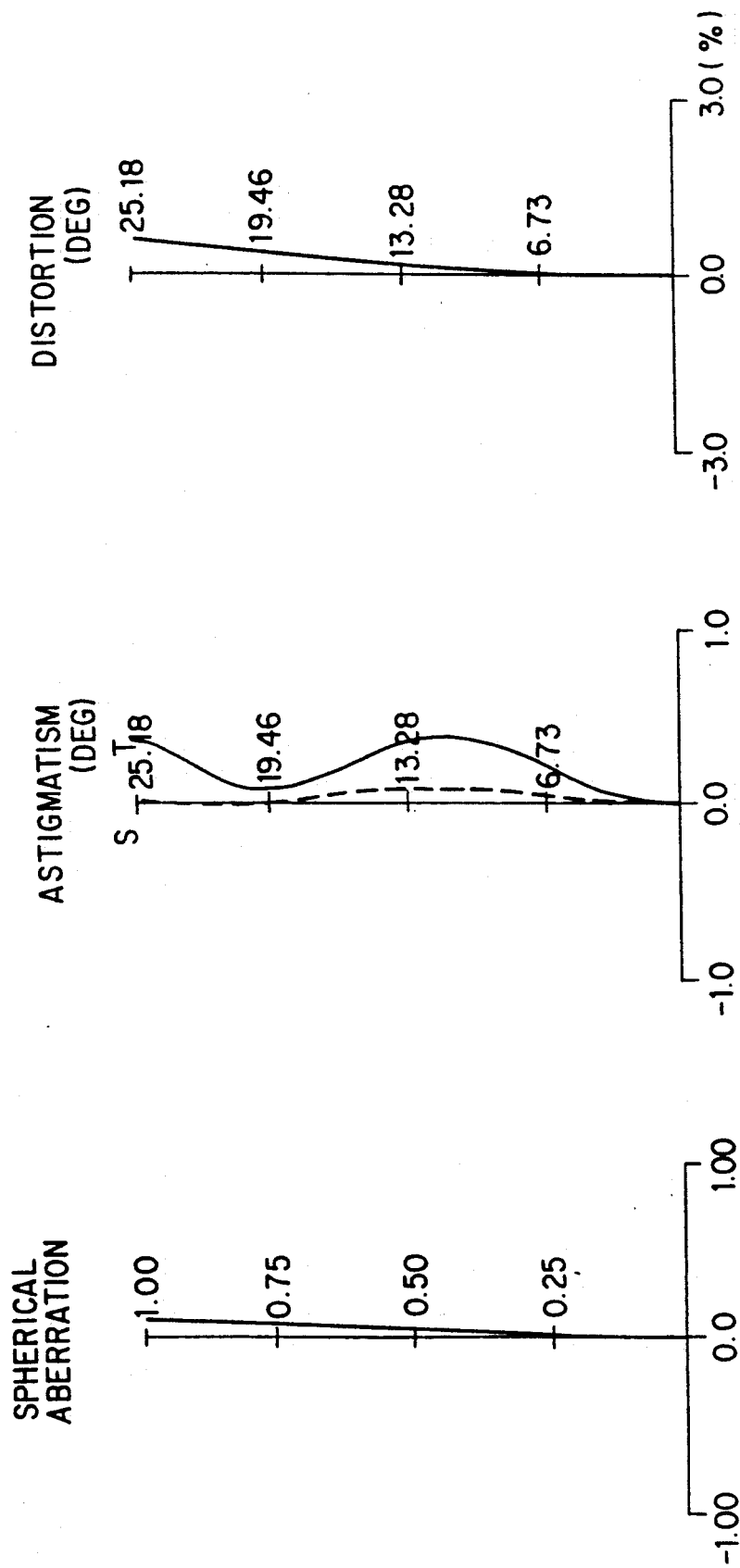

COMAE
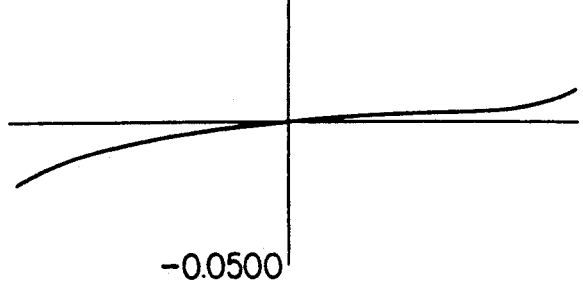
FIG. 21A1   FIG. 21A2
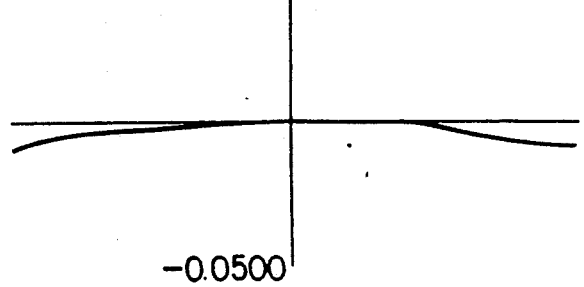
FIG. 21B1   FIG. 21B2
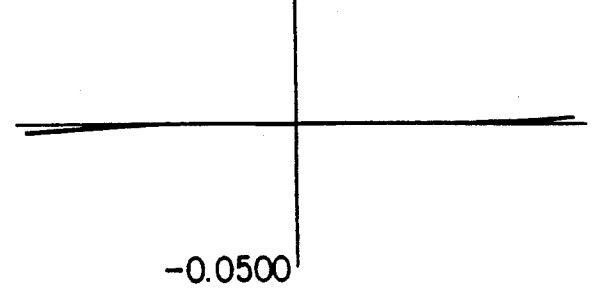
FIG. 21C1   FIG. 21C2

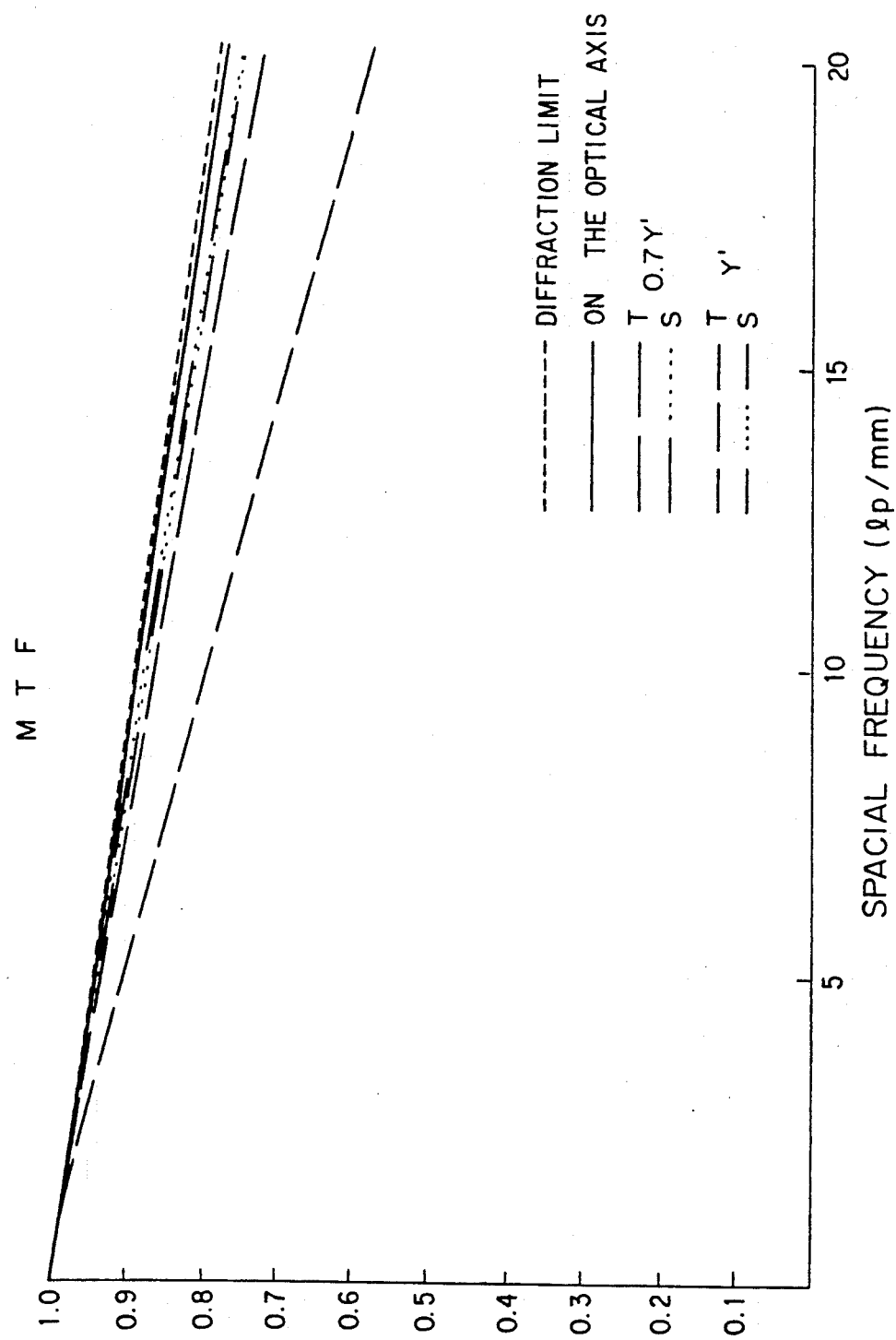

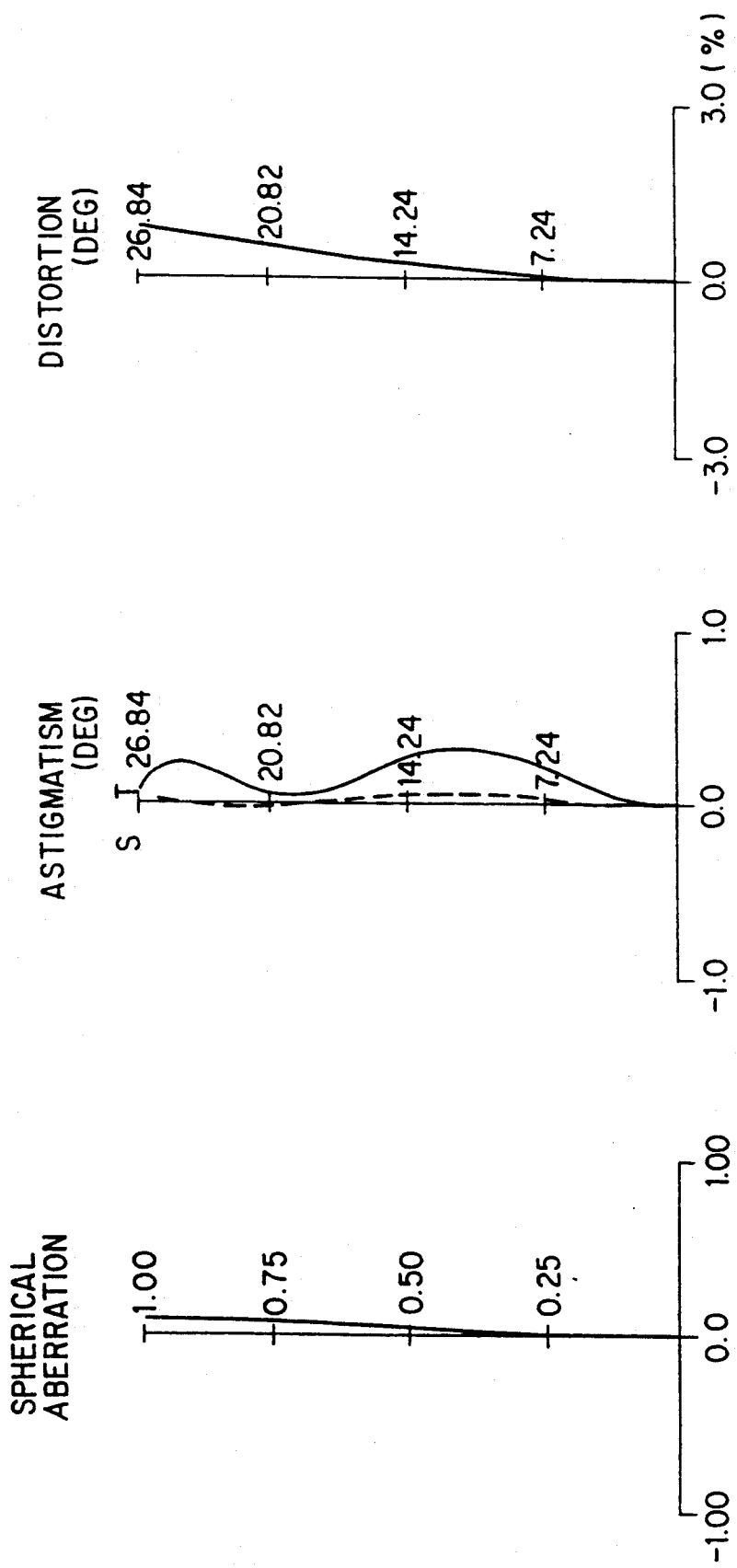

COMAE
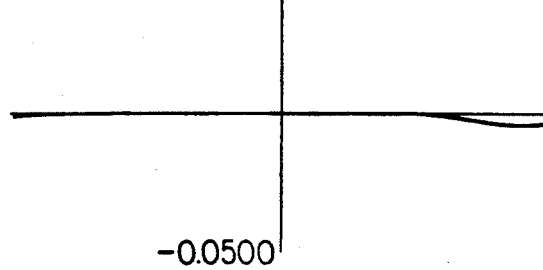
FIG.24A1   FIG.24A2
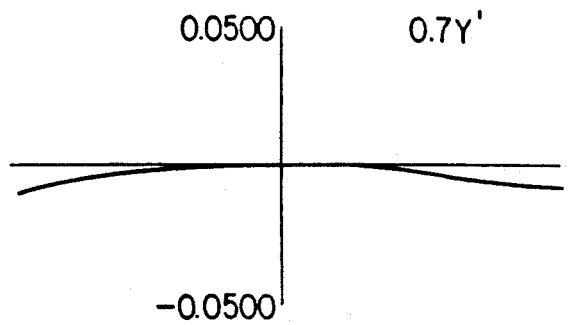
FIG.24B1   FIG.24B2
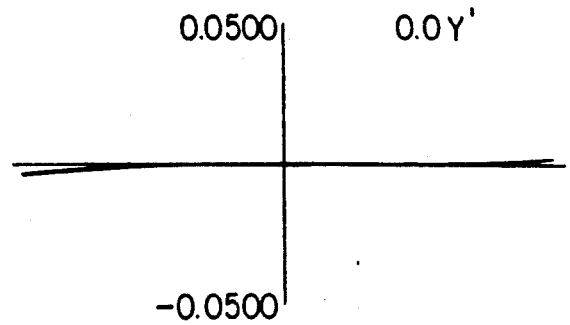
FIG.24C1   FIG.24C2

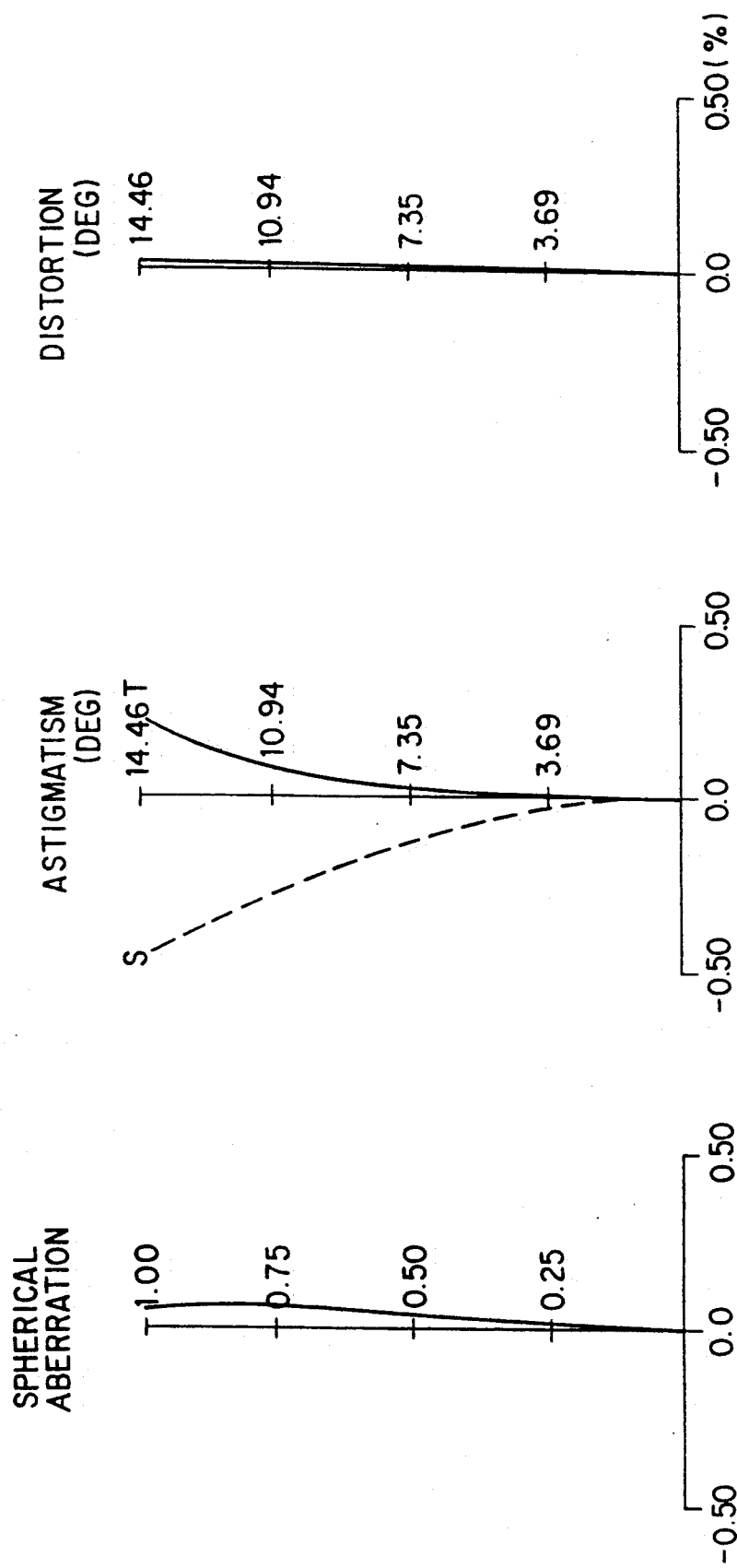

COMAE
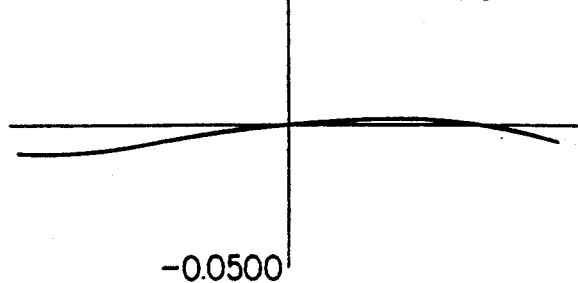
FIG.27A1
FIG. 27A2
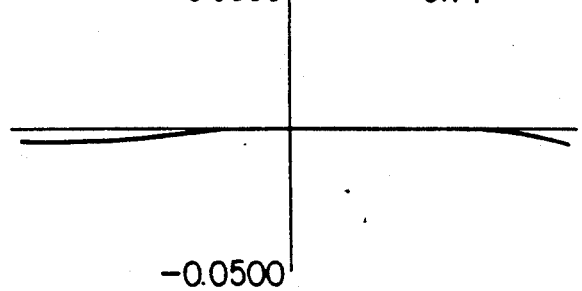
FIG 27B1
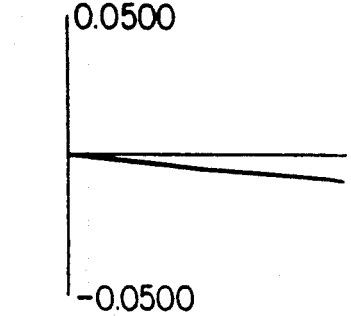
FIG. 27B2
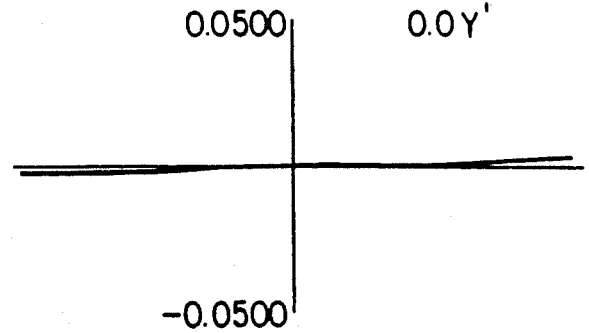
FIG. 27C1
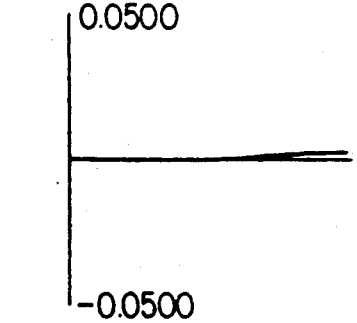
FIG. 27C2

ASPHERICAL LENS SYSTEM FOR A BAR CODE SENSOR

BACKGROUND OF THE INVENTION

This invention relates to an aspherical lens system which is used, for example, in a bar code sensor or reader for sensing a bar code attached to an article or goods.

In general, a bar code sensor of the type described comprises a charge-coupled device (CCD) and an optical lens system for imaging a bar code in a reduced size onto the charge-coupled device. In such optical lens system, an astigmatism, distortion, comae, and the like, must be accurately corrected or adjusted to predetermined ranges.

On the other hand, the charge-coupled device comprises a plurality of charge-coupled elements which are arranged in columns and rows and which are in one-to-one correspondence to single bits to be scanned at every element. Each of the charge-coupled elements often has a size of 14 micron meters. Under the circumstances, it is known that the optical lens system for such a charge-coupled device must have resolving power of 60% for 12 line pairs/mm ($l_p$/mm).

In order to accomplish the above-mentioned resolving power, a conventional lens system of the type described comprises a spherical lens system of a triplet type composed of three lenses divided into three groups. Such a conventional lens system will be referred to as a triplet type spherical lens system. Alternatively, another conventional lens system comprises a plurality of groups which are greater than three groups and which may be called a multi-group lens system.

For example, such a triplet type lens system has been disclosed in Japanese Unexamined Patent Publication No. Sho 60-22109, namely, 22109/1985, assigned to Ricoh Co., Ltd. and comprises a plurality of lenses which are composed of a meniscus lens, a double convex lens, and a double concave lens. The triplet type lens system is developed to be used as an optical lens system for a facsimile device and may be applicable to an optical lens system of the bar code sensor because the optical lens system for the bar code sensor may not be so strict in optical characteristics as compared with the optical lens system for the facsimile device. Therefore, the triplet type lens system disclosed in the above-referenced publication may be readily modified into the optical lens system for the bar code sensor.

However, the triplet type lens system of the above-mentioned type is disadvantageous in that three kinds of lenses must be accurately manufactured to form such a lens system. In addition, the lenses must be accurately mounted in a lens mount. Thus, the lenses and the lens mount should be machined or processed with a high precision. Moreover, the triplet type lens system one requires to precisely assemble the lenses into the lens mount so that the lenses are aligned with one another along optical axis. Inasmuch as manufacturing processes are objectionably increased so as to manufacture the triplet type lens system, the triplet type lens system is very expensive when applied to the bar code sensor.

Consideration might be made about a spherical lens system which is composed of two lenses divided into two groups, respectively. However, it is difficult with this spherical lens system to sufficiently compensate for spherical aberrations and to widen a field angle.

SUMMARY OF THE INVENTION

It is an object of this invention to provide an optical lens system which can desirably compensate for spherical aberrations and offaxial aberrations.

It is another object of this invention to provide an optical lens system of the type described, which is simple in structure.

It is still another object of this invention to provide an optical lens system of the type described, which is readily manufactured and inexpensive.

It is yet another object of this invention to provide an optical lens system which is suitable for a bar code sensor.

According to this invention, an optical lens system has an optical axis extending from an object side to an image side. The optical lens system comprises a first lens on the object side and a second lens on the image side. Each of the first and the second lenses is constituted by a meniscus lens which has a configuration identical with each other and which has a convex surface and a concave surface. The first and the second lenses are arranged back to back along the optical axis with the convex surface of the first lens directed towards the object side and with the convex surface of the second lens directed towards the image side.

BRIEF DESCRIPTION OF THE DRAWING

FIGS. 2(a)–2(c), 3(A1)–3(C2) and 4 show graphical representations of those optical characteristics according to a first example of this invention which are obtained when a reading width of an object is equal to 23 millimeters;

FIGS. 5(a)–5(c), 6(A1)–6(C2) and 7 show similar graphical representations of those optical characteristics according to the first example which are obtained when the reading width is equal to 43 millimeters;

FIGS. 8(a)–8(c), 9(A1)–9(C2) and 10 shows similar graphical representations of those optical characteristics according to a second example of this invention which appear when the reading width is equal to 23 millimeters;

FIGS. 11(a)–11(c), 12(A1)–12(C2) and 13 show similar graphical representations of the optical representations of the second example which appear when the reading width is equal to 43 millimeters;

FIGS. 14(a)–14(c), 15(A1)–15(C2) and 16 show similar graphical representations of those optical representations according to a third example of this invention which are obtained when the reading width is equal to 66 millimeters;

FIGS. 17(a)–17(c), 18(A1)–18(C2) and 19 show similar graphical representations of the optical characteristics of the third example which appear when the reading width is equal to 86 millimeters;

FIGS. 20(a)–20(c), 21(A1)–21(C2) and 22 show similar graphical representations of those optical characteristics according to a fourth example of this invention which are obtained when the reading width is equal to 66 millimeters;

FIGS. 23(a)–23(c), 24(A1)–24(C2) and 25 show similar graphical representations of the optical characteristics of the fourth example which are obtained when the reading width is equal to 86 millimeters;

FIGS. 26(a)-26(c), 27(A1)-27(C2) and 28 show similar graphical representations of those optical characteristics according to a fifth example of this invention which are obtained when the reading width is equal to 23 millimeters.

DESCRIPTION OF THE PREFERRED EMBODIMENTS

Figure 1:
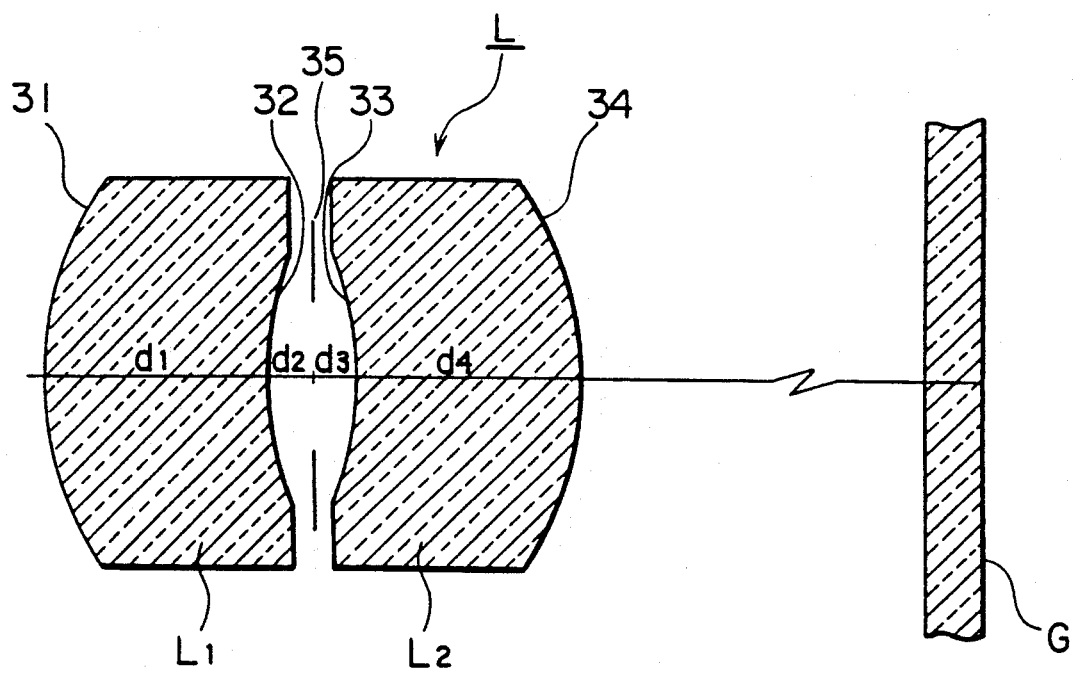
FIG. 1 shows a sectional view of an aspherical lens system according to a preferred embodiment of this invention.

Referring to FIG. 1, an optical lens system according to a preferred embodiment of this invention has an optical axis extending from an object side to an image side and is formed by an aspherical lens system L which is composed of first and second lenses L1 and L2 forming first and second groups, respectively. In this connection, the illustrated optical lens system may be called a lens system of two groups each of which is composed of a single lens, such as L1 and L2. Each of the first and the second lenses L1 and L2 is arranged along the optical axis and has an aspherical lens surface of rotational symmetry. The first and the second lenses L1 and L2 are identical in structure or configuration in cross section with each other, as readily understood from FIG. 1 and are formed of the same optical material. Therefore, each of the first and the second lenses L1 and L2 has the same optical characteristics as the other.

The first and the second lenses L1 and L2 are located near the object side and near the image side, respectively, and therefore form a front and a rear one of the groups with respect to the object side, respectively. On the image side, a charge-coupled device (CCD) is located on the image side and is specified in FIG. 1 by a cover glass plate G of the charge-coupled device.

In FIG. 1, the first lens L1 is formed by a positive meniscus lens and has a first convex surface 31 directed towards the object side, a first concave surface 32 directed towards the image side, and a first thickness d1 on the optical axis. The first convex surface 31 and the first concave surface 32 may be referred to as first and second surfaces of the first lens, respectively.

The second lens L2 is also formed by a positive meniscus lens and has a second concave surface 33 directed towards the first concave surface 32 with an interspace or a distance left between the first concave surface 32 and the second concave surface 33, a second convex surface 34 directed towards the cover glass plate G, and a second thickness d2. More specifically, the second concave surface 33 is an aspherical concave surface of rotational symmetry while the second convex surface 34 is an aspherical convex surface of rotational symmetry. The second convex surface 34 and the second concave surface 33 may be called first and second surfaces of the second lens, respectively.

As shown in FIG. 1, the second lens L2 is located with its back towards the first lens L1. Namely, the first and the second lenses L1 and L2 are arranged back to back. The first and the second lenses L1 and L2 are therefore symmetrical with respect to a point between the first and the second concave surfaces 32 and 34.

Within the interspace, a diaphragm 35 is placed between the first and the second concave surfaces 32 and 34 with a first partial distance d3 left between the first concave surface 32 and the diaphragm 35 and with a second partial distance d4 left between the second concave surface 34 and the diaphragm 35.

At any rate, the first and the second lenses L1 and L2 have first and second effective lens portions which substantially act as lenses and which are determined by the first and the second concave surfaces 32 and 33, respectively. The first and the second lenses L1 and L2 have the same configuration and the same refracting power. Under the circumstances, description will be restricted only to the first lens L1 as a representative. The first convex surface 31 (namely, the first surface) and the first concave surface 32 (namely, the second surface) of the first lens L1 are defined by:

$$Z1 = (C1y^2)/(1 + (1-(1+K1)C1^2y^2)^{\frac{1}{2}}) + E1y^4 + F1y^6 + G1y^8 + H1y^{10} + \ldots \text{ and}$$

$$Z2 = (C2y^2)/(1 + (1-(1+K2)C2^2y^2)^{\frac{1}{2}}) + E2y^4 + F2y^6 + G2y^8 + H2y^{10} + \ldots$$

where y is representative of an incident height from the optical axis;

Z1 is representative of a distance measured along the optical axis between a point placed at the incident height y on the first surface and an additional point on a tangent plane tangential to an apex of the first surface;

Z2 is representative of a distance measured along the optical axis between a point placed at the incident height y on the second surface and another point on a tangent plane tangential to an apex of the second surface;

C1 is curvature of the apex of the first surface and is equal to (1/r1);

C2 is curvature of the apex of the second surface and is equal to (1/r2);

K1 is representative of a coefficient of cone of the first surface;

K2 is representative of a coefficient of cone of the second surface,

E1, F1, G1, and H1 are representative of those aspherical coefficients of the first surface which are proportional to fourth, sixth, eighth, and tenth power of the incident height y, respectively; and E2, F2, G2, and H2 are representative of those aspherical coefficients of the second surface which are proportional to fourth, sixth, eighth, and tenth power of the incident height y; where in turn r1 and r2 are representative of radii of curvature of the apexes of the first and the second surfaces, respectively. The first and the second lenses have the same refractive index and a relationship defined by:

1. $0.25 < (r1/r2)/(n/(n-1)) < 0.5$,
2. $1.2 < f1/f < 1.8$,
3. $0.3 < D/f < 0.6$, and
4. $1.0 < K2$, where n is representative of the refractive index of the first lens;

f is representative of a focal length of of the entire aspherical lens system;

f1 is representative of a focal length of the first lens; and

D is representative of a total length of the aspherical lens system.

Inasmuch as the optical lens system or the aspherical lens system according to the preferred embodiment of this invention comprises only the first and the second lenses L1 and L2 each of which has the same configuration and the same refracting power as the other, it is possible to reduce manufacturing costs. In addition, since the first and the second lenses L1 and L2 each of which is composed of a single lens are arranged along the optical axis with the diaphragm 35 interposed between the first and the second lenses L1 and L2, it is possible to considerably correct distortion due to Seidel aberrations. The remaining aberrations, such as spherical aberration, coma, astigmatism, field curvature, can be reduced to a minimum by forming at least one of the surfaces of each lens L1 and L2 by an aspherical surface of rotational symmetry because such an aspherical surface brings about an aspherical effect. Accordingly, the optical lens system is suitable for a bar code sensor and exhibits corrected aberrations.

Herein, consideration will be made about the first through the fourth formulae 1 through 4. At first, when the formula 1 exceeds an upper limit (0.5), differences of curvature between the first convex surface 31 and the first concave surface 32 and between the second concave surface 33 and the second convex surface 34 become too small. Accordingly, it is difficult to obtain desired refracting power unless the thickness of each of the first and the second lenses L1 and L2 becomes sufficiently great. Furthermore, each of the first and the second lenses L1 and L2 is often rendered into a negative meniscus lens in dependency upon the thickness of each lens L1 and L2 and makes it difficult to attain positive refracting power.

On the other hand, when the first formula 1 becomes smaller than a lower limit (0.25), the spherical aberration becomes serious, although the positive refracting power can be readily obtained. Such a serious spherical aberration can be corrected by the use of aspherical configurations of the first and the second lenses L1 and L2. However, a degree of each aspherical configuration becomes too large, which makes it difficult to manufacture each lens with high precision.

When the second formula 2 exceeds an upper limit (1.8), the interspace or distance between the first and the second lenses L1 and L2 becomes too small to locate the diaphragm 35 between the first and the second lenses L1 and L2. Conversely, when the second formula 2 becomes smaller than a lower limit (1.2), the interspace between the first and the second lenses L1 and L2 becomes great and the effective diameter of each of the first and the second lenses L1 and L2 becomes too large, which makes it difficult to correct spherical aberration.

The third formula 3 defines a condition of making the aspherical lens system L compact. When the third formula 3 exceeds an upper limit (0.6), the total length D of the aspherical lens system L becomes too great and the effective diameter of each of the lenses becomes large. As a result, the aspherical lens system L becomes large. On the other hand, when the third formula 3 becomes smaller than a lower limit (0.3), it is very difficult to correct astigmatism, although the aspherical lens system becomes small.

In an optical lens system for a bar code sensor, it is generally important to keep resolving power at a high value in a tangential direction extending, namely, a direction extending laterally extended relative to bars of the bar code. To this end, the coefficient of cone should be kept at a positive value and an elliptic surface of rotational symmetry should be formed with respect to a minor axis.

The fourth formula 4 is for correcting the astigmatism in a tangential direction. It has been found that, when the coefficient $K_2$ of cone does not satisfy the fourth formula 4, the astigmatism along the tangential direction tends to be positive, which brings about curvature of field.

If a severe characteristic is not required for such an optical lens system of the bar code sensor, the first convex surface 31 and the second convex surface 34 may be spherical. With this structure, it is possible to reduce manufacturing costs because such lenses L1 and L2 can be readily manufactured in comparison with lenses having aspherical surfaces.

Herein, Table 1 shows aspherical lens systems according to first through fifth examples of this invention.

TABLE 1

| Example | f (mm) | Aperture Ratio | Image Width (mm) | Thickness of Cover Glass (mm) | Refractive Index of Lenses |
|---|---|---|---|---|---|
| 1 | 18.00 | 6.5 | 15.0 | 0.8 | 1.7254 |
| 2 | 18.00 | 6.7 | 15.0 | 0.8 | 1.4900 |
| 3 | 21.69 | 11.0 | 28.7 | 0.7 | 1.7254 |
| 4 | 21.15 | 10.3 | 28.7 | 0.7 | 1.4892 |
| 5 | 17.50 | 6.5 | 15.0 | 0.8 | 1.7254 |

More particularly, the aspherical lens systems according to the first through the fifth examples of this invention will be described hereinunder. Herein, it is assumed that the thicknesses d1 and d4 of the first and the second lenses L1 and L2 are equal to each other and that a radius r3 of the diaphragm 35 is infinite.

FIRST EXAMPLE

| | | |
|---|---|---|
| f | | 18.00 mm |
| Aperture Ratio | | 1:6.5 |
| Image Width (Sensor Width) | | 15.0 mm |
| f1 | | 26.23 mm |
| Thickness of Cover Glass | | 0.8 mm |
| Refractive Index of Cover Glass | | 1.505 |
| r1 = 5.0771 | d1 = 3.0000 | n1 = 1.7254 |
| r2 = 5.2044 | d2 = 0.6000 | |
| r3 = ∞ (Diaphragm) | d3 = d2 | |
| r4 = −r2 | d4 = d1 | n4 = n1 |
| r5 = −r1 | | |
| K1 = 0.4052 | | |
| E1 = −2.5966 × 10$^{-4}$ | F1 = 2.7546 × 10$^{-5}$ | |
| G1 = −1.2619 × 10$^{-6}$ | H1 = 4.2774 × 10$^{-7}$ | |
| K2 = 3.2397 | | |
| E2 = −1.4917 × 10$^{-4}$ | F2 = −5.7793 × 10$^{-5}$ | |
| G2 = 1.6407 × 10$^{-5}$ | H2 = −9.1923 × 10$^{-6}$ | |
| K4 = K2 | | |
| E4 = −E2  F4 = −F2 | G4 = −G2 | H4 = −H2 |
| K5 = K1 | | |
| E5 = −E1  F5 = −F1 | G5 = −G1 | H5 = −H1 |

SECOND EXAMPLE

| | | |
|---|---|---|
| f | | 18.00 mm |
| Aperture Ratio | | 1:6.7 |
| Image Width (Sensor Width) | | 15.0 mm |
| f1 | | 22.93 mm |
| Thickness of Cover Glass | | 0.8 mm |
| Refractive Index of Cover Glass | | 1.505 |
| r1 = 3.1974 | d1 = 3.0000 | n1 = 1.4900 |
| r2 = 3.0902 | d2 = 1.2500 | |
| r3 = ∞ (Diaphragm) | d3 = d2 | |
| r4 = −r2 | d4 = d1 | n4 = n1 |
| r5 = −r1 | | |
| K1 = 0.1366 | | |
| E1 = −2.3607 × 10$^{-4}$ | F1 = 3.3315 × 10$^{-6}$ | |
| G1 = −5.6133 × 10$^{-6}$ | H1 = −3.3887 × 10$^{-8}$ | |
| K2 = 2.4166 | | |
| E2 = −3.3291 × 10$^{-3}$ | F2 = −1.2824 × 10$^{-3}$ | |
| G2 = 1.7505 × 10$^{-4}$ | H2 = −2.7484 × 10$^{-4}$ | |
| K4 = K2 | | |
| E4 = −E2  F4 = −F2 | G4 = −G2 | H4 = −H2 |
| K5 = K1 | | |

-continued

| | | | |
|---|---|---|---|
| E5 = −E1 | F5 = −F1 | G5 = −G1 | H5 = −H1 |

THIRD EXAMPLE

| | | |
|---|---|---|
| f | | 21.69 mm |
| Aperture Ratio | | 1:11.0 |
| Image Width (Sensor Width) | | 28.7 mm |
| f1 | | 29.84 mm |
| Thickness of Cover Glass | | 0.7 mm |
| Refractive Index of Cover Glass | | 1.514 |
| r1 = 5.9845 | d1 = 3.2500 | n1 = 1.7254 |
| r2 = 6.3841 | d2 = 2.5000 | |
| r3 = ∞ (Diaphragm) | d3 = d2 | |
| r4 = −r2 | d4 = d1 | n4 = n1 |
| r5 = −r1 | | |
| K1 = 0.5672 | | |
| E1 = −9.2056 × $10^{-5}$ | F1 = −2.3176 × $10^{-8}$ | |
| G1 = −3.3119 × $10^{-7}$ | H1 = −1.4369 × $10^{-9}$ | |
| K2 = 2.8733 | | |
| E2 = −1.3242 × $10^{-4}$ | F2 = −6.8494 × $10^{-5}$ | |
| G2 = 1.7196 × $10^{-6}$ | H2 = 2.6888 × $10^{-18}$ | |
| K4 = K2 | | |
| E4 = −E2 | F4 = −F2 | G4 = −G2 | H4 = −H2 |
| K5 = K1 | | |
| E5 = −E1 | F5 = −F1 | G5 = −G1 | H5 = −H1 |

FOURTH EXAMPLE

| | | |
|---|---|---|
| f | | 21.15 mm |
| Aperture Ratio | | 1:10.3 |
| Image Width (Sensor Width) | | 28.7 mm |
| f1 | | 28.58 mm |
| Thickness of Cover Glass | | 0.7 mm |
| Refractive Index of Cover Glass | | 1.514 |
| r1 = 4.5094 | d1 = 3.7500 | n1 = 1.4892 |
| r2 = 4.8377 | d2 = 1.4571 | |
| r3 = ∞ (Diaphragm) | d3 = d2 | |
| r4 = −r2 | d4 = d1 | n4 = n1 |
| r5 = −r1 | | |
| K1 = 0.2906 | | |
| E1 = −1.5274 × $10^{-4}$ | F1 = 2.3856 × $10^{-6}$ | |
| G1 = −4.1937 × $10^{-7}$ | H1 = −5.7617 × $10^{-8}$ | |
| K2 = 3.4085 | | |
| E2 = −9.1084 × $10^{-4}$ | F2 = −3.5453 × $10^{-4}$ | |
| G2 = 8.6884 × $10^{-17}$ | H2 = 3.4131 × $10^{-20}$ | |
| K4 = K2 | | |
| E4 = −E2 | F4 = −F2 | G4 = −G2 | H4 = −H2 |
| K5 = K1 | | |
| E5 = −E1 | F5 = −F1 | G5 = −G1 | H5 = −H1 |

FIFTH EXAMPLE

| | | |
|---|---|---|
| f | | 17.50 mm |
| Aperture Ratio | | 1:6.5 |
| Image Width (Sensor Width) | | 15.0 mm |
| f1 | | 28.80 mm |
| Thickness of Cover Glass | | 0.8 mm |
| Refractive Index of Cover Glass | | 1.505 |
| r1 = 7.7090 | d1 = 2.8 | n1 = 1.7254 |
| r2 = 10.3507 | d2 = 0.7 | |
| r3 = ∞ (Diaphragm) | d3 = d2 | |
| r4 = −r2 | d4 = d1 | n4 = n1 |
| r5 = −r1 | | |
| K1 = 2.5552 | | |
| E2 = 6.7265 × $10^{-5}$ | F2 = −1.1463 × $10^{-5}$ | |
| G2 = −2.6116 × $10^{-6}$ | H2 = −1.0033 × $10^{-7}$ | |
| K4 = K2 | | |
| E4 = −E2 | F4 = −F2 | G4 = −G2 | H4 = −H2 |

The aspherical lens systems according to the first through the fifth examples have excellent characteristics, namely, corrected aberrations.

Description will be made in detail about the optical characteristics of each aspherical lens system according to the first through the fifth examples of this invention.

The aspherical lens system according to the first example of this invention exhibits optical characteristics, as illustrated in FIGS. 2 through 7. More particularly, the aspherical lens system according to the first example has spherical aberration, astigmatism, and distortion, as shown in FIGS. 2(A), (B), and (C), respectively, when it is used for sensing a bar code having a reading width of 23 millimeters. FIGS. 3(A1), (B1), and (C1) show comae which appear along a tangential (meridional) direction with respect to optical rays incident at field angles of 100% and 70% and on the optical axis, respectively. Likewise, FIGS. 3(A2), (B2), and (C2) show comae which appear along a sagittal direction with respect to the optical rays incident at field angles of 100% and 70% and on the optical axis, respectively. In addition, an MTF (Modulation Transfer Function) characteristic is illustrated in FIG. 4 to exhibit a relationship between a diffraction limit (broken line) and a spacial frequency taken along an abscissa.

When the reading width is equal to 43 millimeters, the aspherical lens system according to the first example of this invention exhibits spherical aberration, astigmatism, and distortion, as illustrated in FIGS. 5(A), (B), and (C), respectively. In addition, the aspherical lens system has comae which appear along the tangential direction with respect to the optical rays incident at field angles of 100% and 70% and on the optical axis, as shown in FIGS. 6(A1), (B1), and (C1), respectively. As shown in FIGS. 6(A2), (B2), and (C2), comae also appear in the aspherical lens system along the sagittal direction with respect to the optical rays incident at field angles of 100% and 70% and on the optical axis, respectively. Moreover, the MTF characteristic is also illustrated in FIG. 7.

Figure 10:
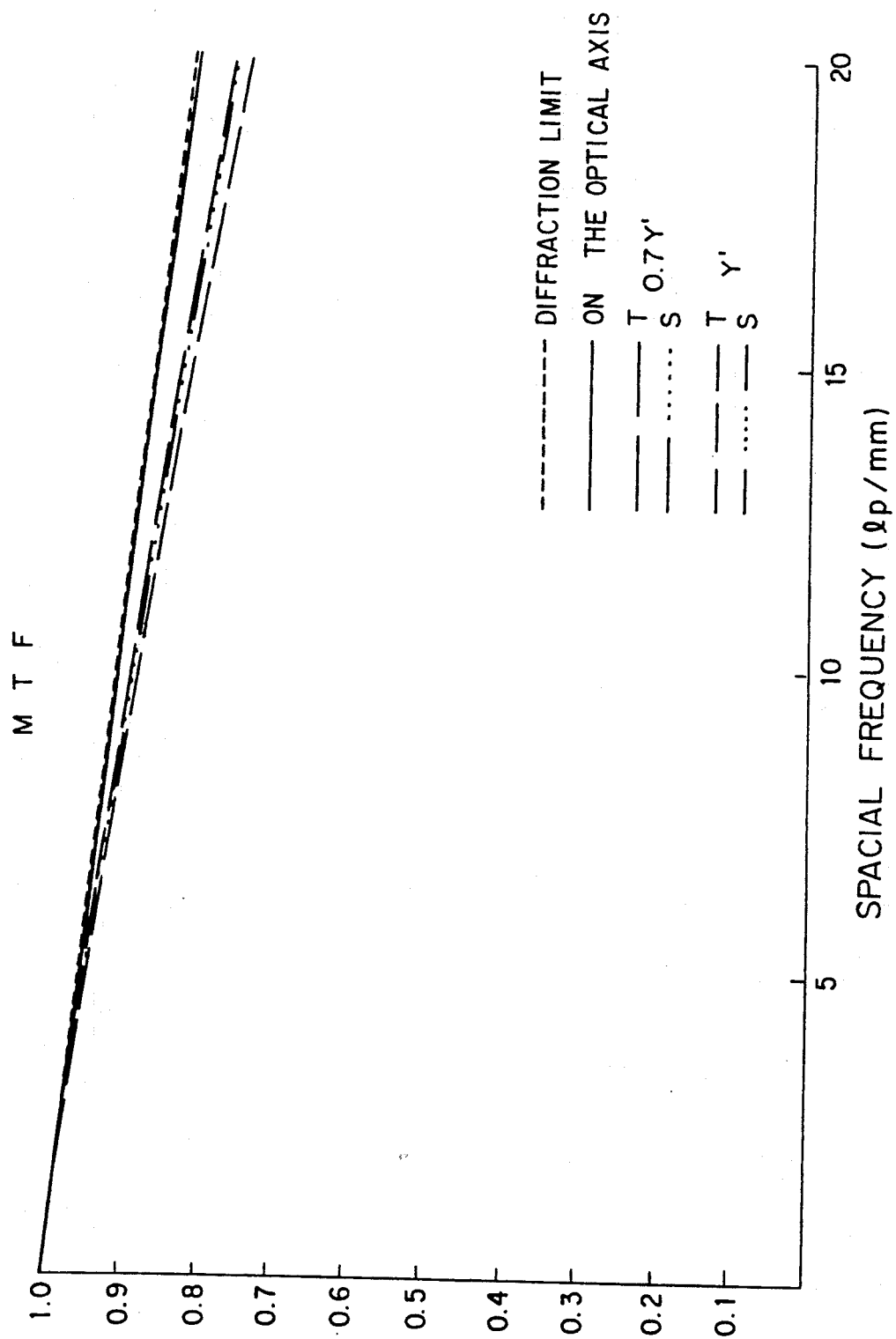

The aspherical lens system according to the second example of this invention exhibits spherical aberration, astigmatism, and distortion, as illustrated in FIGS. 8(A), (B), and (C), respectively, when the reading width is equal to 23 millimeters. In this case, the comae appear, as illustrated in FIGS. 9(A1), (B1), and (C1), along the tangential direction with respect to the optical rays incident at field angles of 100% and 70% and on the optical axis, respectively. The comae along the sagittal direction also appear, as illustrated in FIGS. 9(A2), (B2), and (C2) with respect to the optical rays incident at field angles of 100% and 70% and on the optical axis. In addition, the aspherical lens system has the MTF characteristic as shown in FIG. 10.

When the reading width is equal to 43 millimeters, the aspherical lens system in question has spherical aberration, astigmatism, and distortion, as shown in FIGS. 11(A), (B), and (C). As illustrated in FIGS. 12(A1), (B1), and (C1), the comae along the tangential direction appear with respect to the optical rays incident at the field angles of 100% and 70% and on the optical axis, respectively. Likewise, the comae along the sagittal direction appear with respect to the optical rays incident at the field angles of 100% and 70% and on the optical axis, as illustrated in FIGS. 12(A2), (B2), and (C2), respectively. In this event, the aspherical lens system has the MTF characteristic which is illustrated in FIG. 13. As readily understood from FIGS. 11 through 13, the aspherical lens system in question exhibits improved optical characteristics.

As regards the aspherical lens system according to the third example of this invention, the optical characteristics are also considered on the condition that the reading width is equal to 66 millimeters. In this event, spherical aberration, astigmatism, and distortion appear, as illustrated in FIGS. 14(A), (B), and (C), respectively, while the comae along the tangential direction appear with respect to the optical rays incident at the field angles of 100% and 70% and on the optical axis, as shown in FIGS. 15(A1), (B1), and (C1), respectively. The comae along the sagittal direction which appear with respect to the optical rays incident at field angles of 100% and 70% and on the optical axis are shown in FIGS. 15(A2), (B2), and (C2), respectively. In addition, the MTF characteristic is illustrated in FIG. 16.

Figure 19:
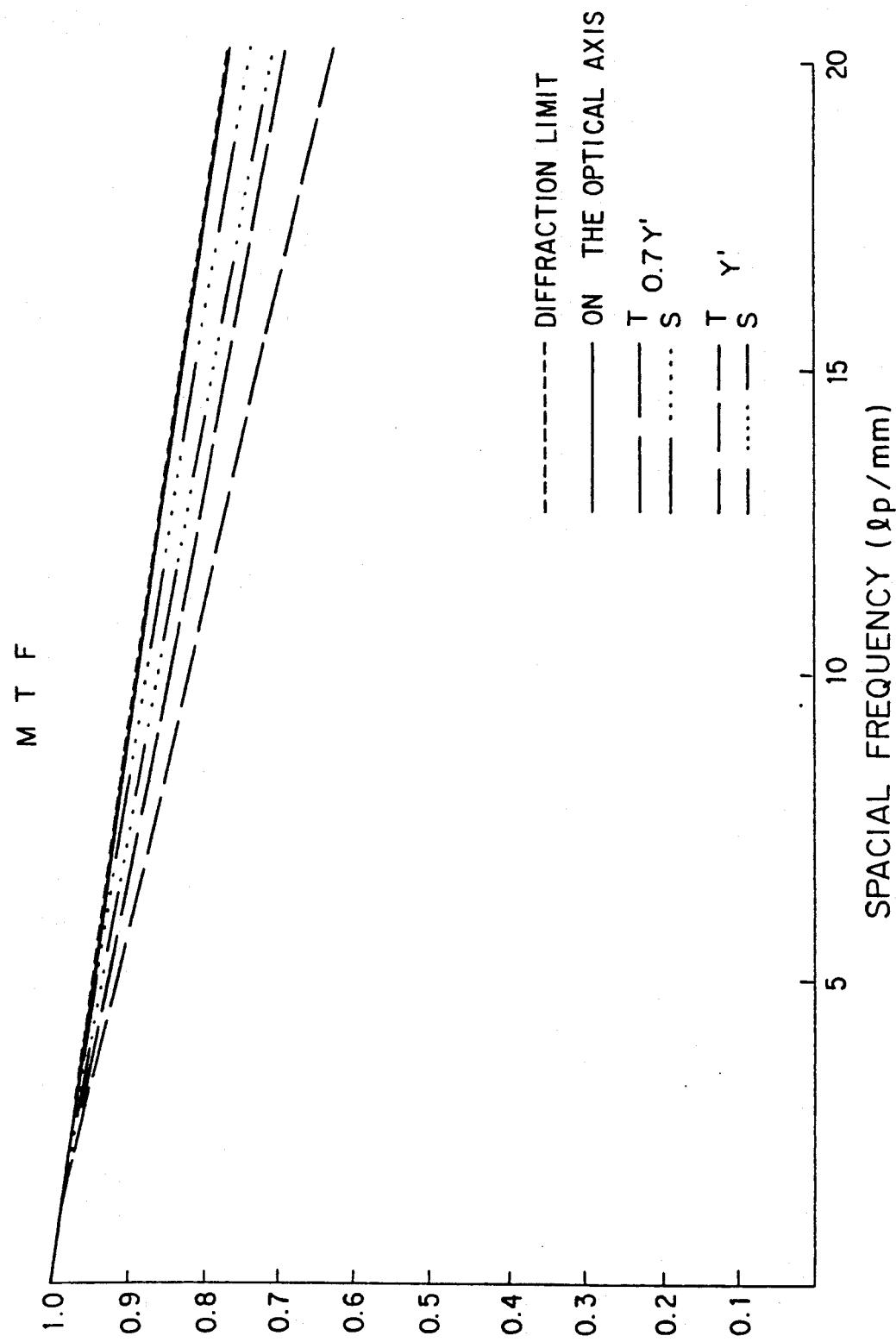

When the reading width is equal to 86 millimeters, the aspherical lens system according to the third example of this invention exhibits the optical characteristics, as illustrated in FIGS. 17 through 19. Specifically, spherical aberration, astigmatism, and distortion are illustrated in FIGS. 17(A), (B), and (C), respectively, while the comae along the tangential direction appear with respect to the optical rays incident at field angles of 100% and 70% and on the optical axis, as shown in FIGS. 18(A1), (B1), and (C1), respectively, and the comae along the sagittal directions appear with respect to the optical rays incident at the field angles of 100% and 70% and on the optical axis, as shown in FIGS. 18(A2), (B2), and (C2), respectively. The MTF characteristic is illustrated in FIG. 19. From FIGS. 17 through 19, it is readily understood that the aspherical lens system according to the third example has improved optical characteristics even when the reading width is equal to 86 millimeters.

Likewise, the aspherical lens system according to the fourth example of this invention has spherical aberration, astigmatism, and distortion, as illustrated in FIGS. 20(A), (B), and (C), respectively, when the reading width is equal to 66 millimeters. The comae along the tangential direction appear, as illustrated in FIGS. 21(A1), (B1), and (C1), with respect to the optical rays incident at field angles of 100% and 70% and on the optical axis, respectively, while the comae along the sagittal direction appear, as shown in FIGS. 21(A2), (B2), and (C2), with respect to the optical rays incident at the field angles of 100% and 70% and on the optical axis, respectively. The MTF characteristic is shown in FIG. 22.

Figure 25:
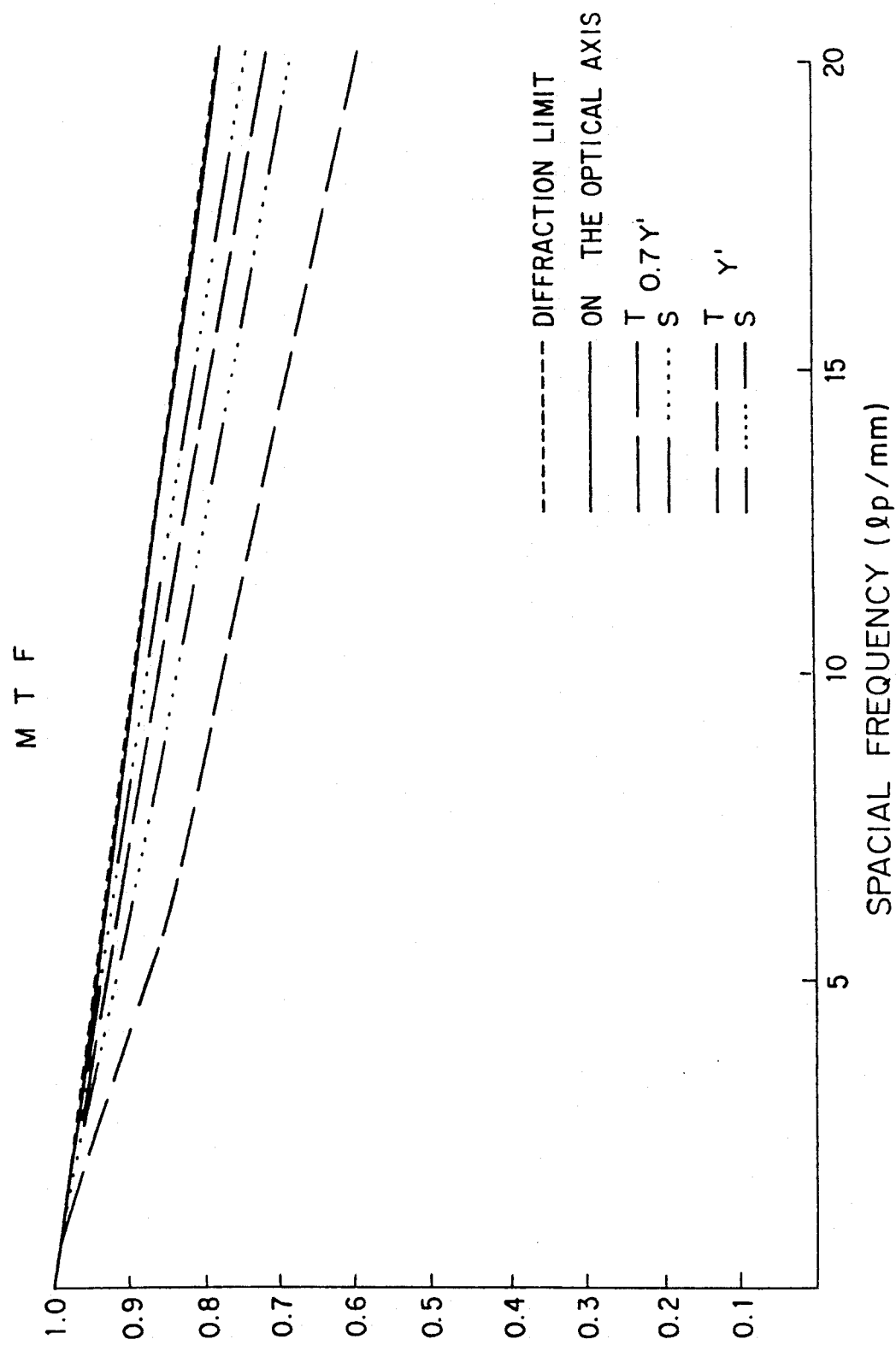

When the reading width is equal to 86 millimeters, the aspherical lens system according to the fourth example has spherical aberration, astigmatism, and distortion, respectively, as illustrated in FIGS. 23(A), (B), and (C). The comae along the tangential direction appear, as shown in FIGS. 24(A1), (B1), and (C1), when the incident rays are incident at the field angles of 100% and 70% and on the optical axis, respectively. Likewise, the comae along the sagittal direction are shown in FIGS. 24(A2), (B2), and (C2) with respect to the incident rays incident at the field angles of 100% and 70% and on the optical axis, respectively. The MTF characteristic is also illustrated in FIG. 25. As readily understood from FIGS. 20 to 25, the aspherical lens system according to the fourth example is also improved in the optical characteristics.

Figure 28:
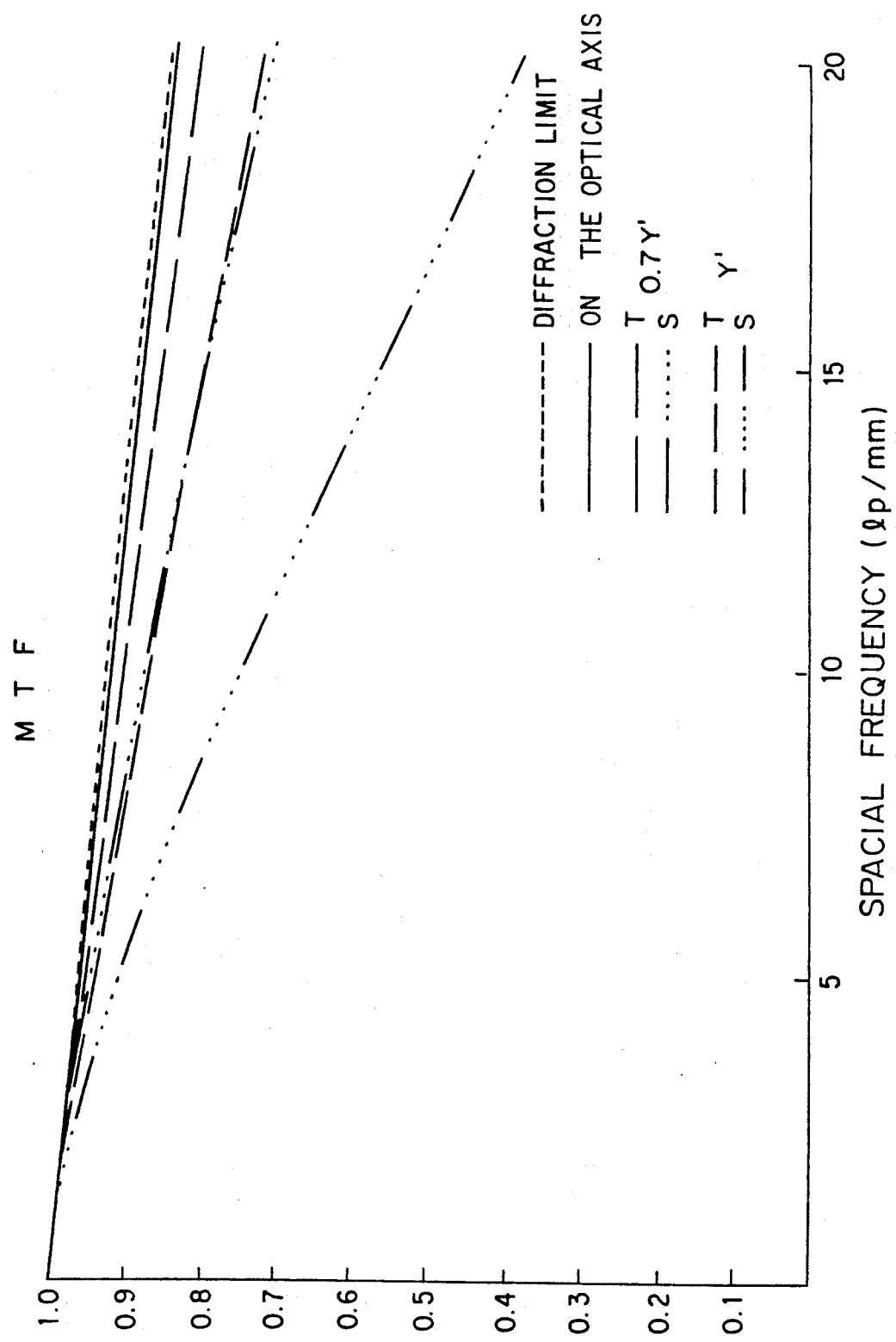

The aspherical lens system according to the fifth example of this invention exhibits spherical aberration, astigmatism, and distortion, as illustrated in FIGS. 26(A), (B), and (C), respectively, when the reading width is equal to 23 millimeters. Under the circumstances, the comae along the tangential direction appear, as illustrated in FIGS. 27(A1), (B1), and (C1), with respect to the optical rays incident at field angles of 100% and 70% and on the optical axis, respectively, while the comae along the sagittal direction appear, as shown in FIGS. 27(A2), (B2), and (C2), with respect to the optical rays incident at the field angles of 100% and 70% and on the optical axis, respectively. The MTF characteristic of the aspherical lens system in question is also illustrated in FIG. 28. From the optical characteristics, it has been confirmed that excellent correction is accomplished in the aspherical lens system.

Figure 29:
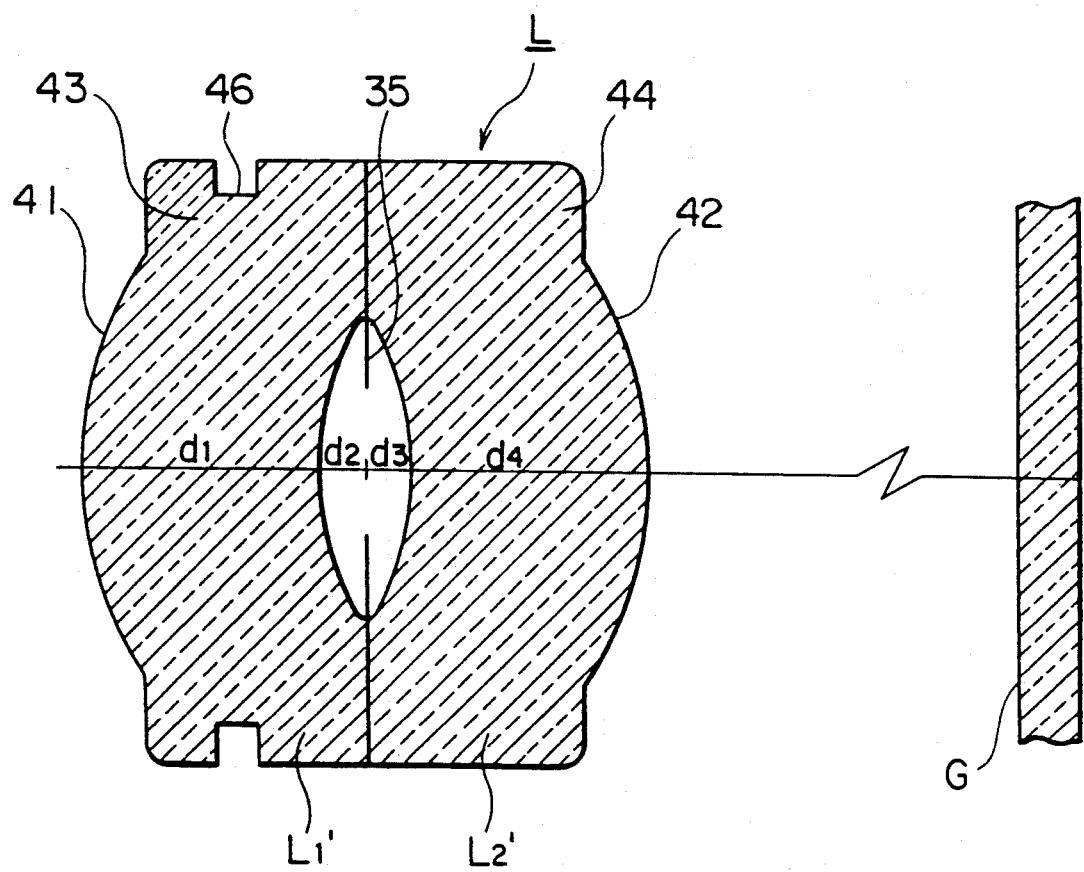
FIG. 29 shows a sectional view of an aspherical lens system according to a modification of this invention.

Referring to FIG. 29, an aspherical lens system according to a modification of this invention comprises first and second lenses L1' and L2' each of which has an effective lens portion 41 and 42 substantially acting as a lens and a flange 43 and 44 contiguous to the effective lens portion along an outer periphery of each effective lens portion. The illustrated flanges 43 and 44 are integral with the effective lens portions 41 and 42, respectively, and serve to fix the first and the second lenses L1' and L2' to a support frame (not shown).

The first lens L1' illustrated in FIG. 29 has a recessed portion 46 formed along a peripheral portion of the flange 43 so as to fix the first lens L1'. Such a recessed portion might be formed either on both the first and the second lenses L1' and L2' or on at least one of the first and the second lenses L1' and L2'.

In addition, the first and the second lenses L1' and L2' are located in FIG. 29 so that the flanges 43 and 44 are adjacent to each other with the diaphragm 35 interposed therebetween. This structure dispenses with any spacer which should be interposed between the first and the second lenses L1 and L2 (as shown in FIG. 1) so as to fix the diaphragm 35 when an interval is left between the first and the second lenses L1 and L2.

While this invention has thus far been described in conjunction with several embodiments thereof, it will readily be possible for those skilled in the art to put this invention into practice in various other manners. For example, the first and the second lenses L1 and L2 or L1' and L2' may not be placed in symmetry with respect to the diaphragm 35. At any rate, the diaphragm 35 may be interposed between the first and the second lenses. In FIG. 29, a part of a support frame may be integral with each of the first and the second lenses L1' and L2' so as to dispense with the support frame.

In each embodiment, each of the first and the second lenses may be composed of optical glass which is excellent in heat resistance, humidity durability, and temperature characteristic. However, optical plastics or the like may be used for various purposes.

In any event, it is possible to obtain the aspherical lens system which is composed of two lenses and which has aperture efficiency of 100%. Such aperture efficiency serves to compensate for lack of light which might occur in the vicinity of both ends of each bar code.

What is claimed is:

1. An optical lens system having an optical axis extending from an object side to an image side, said optical lens system comprising a first lens on said object side and a second lens on said image side, said first and said second lenses being respectively constituted by a meniscus lens of substantially identical configuration to one another and having convex and concave first and second surfaces, respectively, said first and said second lenses being arranged back to back along said optical axis with the first surface of the first lens directed towards said object side and the first surface of the second lens directed towards said image side, said first and second surfaces of each of said first and said second lenses having effective lens surfaces defined by first and second sets of predetermined formula, said first set of the predetermined formula being given by:

$$Z1 = (C1y^2)/(1+(1-(1+K1)C1^2y^2)^{\frac{1}{2}}) + E1y^4 + F1y^6 + G1y^8 H1y^{10} + \ldots \text{ and}$$

$$Z2 = (C2y^2)/(1+(1-(1+K2)C2^2y^2)^{\frac{1}{2}}) + +E2y^4 + F2y^6 + G2y^8 + H2y^{10} + \ldots,$$

where y is representative of incident height from said optical axis;

Z1 is representative of distance measured along said optical axis between a point placed at the incident height y on the first surface and an additional point on a tangential plane tangent to an apex of the first surface;

Z2 is representative of distance measured along said optical axis between a point placed at the incident height y on the second surface and another point on a tangential plane tangent to an apex of the second surface;

C1 is curvature of the apex of the first surface and is equal to (1/r1);

C2 is curvature of the apex of the second surface and is equal to (1/r2);

K1 is representative of a coefficient of cone of the first surface;

K2 is representative of a coefficient of cone of the second surface;

E1, F1, G2 and H2 are representative of those aspherical coefficients of the first surface which are proportional to fourth, sixth, eighth and tenth power of the incident height y, respectively; and E2, F2, G2 and H2 are representative of those aspherical coefficients of the second surface which are proportional to fourth, sixth, eighth and tenth power of the incident height y; where in turn r1 and r2 are representative of radii of curvature of the apexes of the first and the second surfaces, respectively, said second set of the predetermined formula being given by:

$$0.25 < (r1/r2)/(n/(n-1)) < 0.5,$$
$$1.2 < f1/f < 1.8,$$
$$0.3 < D/F < 0.6, \text{ and}$$
$$1.0 < K2,$$

where r1 is representative of radius of curvature measured at an apex of said first surface; r2 is radius of curvature measured at an apex of said second surface; n is refractive index of each lens; f is total focal length of the entire said optical lens system; f1 is focal length of the first lens; and D is total length of said optical lens system.

2. An optical lens system as claimed in claim 1, further comprising:
a diaphragm interposed between said first and second lenses.

3. An optical lens system as claimed in claim 2, wherein said first and said second lenses are kept in substantial contact with each other through said diaphragm.

4. An optical lens system as claimed in claim 1, wherein each of said first and said second lenses has a flange portion contiguous to the effective lens surfaces along an outer periphery of the effective lens surface.

5. An optical lens system as claimed in claim 1, wherein said first and said second lenses are arranged with an interspace between said first and said second lenses and with the second surfaces of said first and said second lenses opposed to each other.

* * * * *